United States Patent
Pai et al.

(10) Patent No.: US 12,277,306 B2
(45) Date of Patent: Apr. 15, 2025

(54) CLOUD SERVICE PLATFORM INTEGRATION WITH DEALER MANAGEMENT SYSTEMS

(71) Applicant: CDK GLOBAL, LLC, Hoffman Estates, IL (US)

(72) Inventors: Abhijeet Pai, Beaverton, OR (US); Will Padron, Pembroke Pines, FL (US); Daniel Green, Albany, OR (US); Bruce Suitor, Rockville, MD (US); Ethan Heusser, Portland, OR (US); Northon Rodrigues, Oregon City, OR (US); Akshay Mishra, Hyderabad (IN); Yash Kumar Sharma, Hyderabad (IN); Abinay Muppidi, Telangana (IN); Sai Priya Katkam, Telangana (IN); Winn Davis, Houston, TX (US)

(73) Assignee: CDK GLOBAL, LLC, Hoffman Estates, IL (US)

( * ) Notice: Subject to any disclaimer, the term of this patent is extended or adjusted under 35 U.S.C. 154(b) by 106 days.

(21) Appl. No.: 17/661,875

(22) Filed: May 3, 2022

(65) Prior Publication Data
US 2023/0359333 A1 Nov. 9, 2023

(51) Int. Cl.
*G06F 16/00* (2019.01)
*G06F 3/04842* (2022.01)
(Continued)

(52) U.S. Cl.
CPC ........ *G06F 3/04842* (2013.01); *G06F 9/5072* (2013.01); *G06F 16/252* (2019.01); *G06F 16/27* (2019.01)

(58) Field of Classification Search
CPC .................................................. G06F 16/252
See application file for complete search history.

(56) References Cited

U.S. PATENT DOCUMENTS

| | | |
|---|---|---|
| 3,792,445 A | 2/1974 | Bucks et al. |
| 4,258,421 A | 3/1981 | Juhasz et al. |

(Continued)

FOREIGN PATENT DOCUMENTS

| | | |
|---|---|---|
| CA | 2494350 | 5/2004 |
| EP | 0461888 | 3/1995 |
| WO | 2007002759 | 1/2007 |

OTHER PUBLICATIONS http:/web.archive.org/web/20010718130244/http://chromedata.com/maing2/about/index.asp, 1 pg.
(Continued)

*Primary Examiner* — Ajith Jacob
(74) *Attorney, Agent, or Firm* — Stoel Rives LLP

(57) ABSTRACT

Systems and methods for network-based cloud service platform integrations with dealer management systems (DMS) are disclosed herein. A cloud service platform may integrate over the network with an instance of a DMS used by an end user. The cloud service platform may define fields that can be used in conjunction with forms useable with the DMS, and may be further capable of storing field data for those fields. The cloud service platform may provide a graphical user interface (GUI) prompt to a user of the DMS to provide the field data. A form using the fields defined at the cloud service platform may be provided to the cloud service platform and filled at the cloud service platform using field data for those fields stored at the cloud service platform. The form may then be provided to a print service for presentation to the user.

14 Claims, 14 Drawing Sheets

(51) Int. Cl.
  *G06F 9/50* (2006.01)
  *G06F 16/25* (2019.01)
  *G06F 16/27* (2019.01)

(56) References Cited

U.S. PATENT DOCUMENTS

| | | | |
|---|---|---|---|
| 4,992,940 A | 2/1991 | Dworkin |
| 5,003,476 A | 3/1991 | Abe |
| 5,034,889 A | 7/1991 | Abe |
| 5,058,044 A | 10/1991 | Stewart et al. |
| 5,421,015 A | 5/1995 | Khoyi et al. |
| 5,442,553 A | 8/1995 | Parrillo |
| 5,452,446 A | 9/1995 | Johnson |
| 5,521,815 A | 5/1996 | Rose, Jr. |
| 5,649,186 A | 7/1997 | Ferguson |
| 5,694,595 A | 12/1997 | Jacobs et al. |
| 5,729,452 A | 3/1998 | Smith et al. |
| 5,764,943 A | 6/1998 | Wechsler |
| 5,787,177 A | 7/1998 | Leppek |
| 5,790,785 A | 8/1998 | Klug et al. |
| 5,835,712 A | 11/1998 | Dufresne |
| 5,845,299 A | 12/1998 | Arora et al. |
| 5,862,346 A | 1/1999 | Kley et al. |
| 5,911,145 A | 6/1999 | Arora et al. |
| 5,956,720 A | 9/1999 | Fernandez et al. |
| 5,974,149 A | 10/1999 | Leppek |
| 5,974,418 A | 10/1999 | Blinn et al. |
| 5,974,428 A | 10/1999 | Gerard et al. |
| 5,978,776 A | 11/1999 | Seretti et al. |
| 5,987,506 A | 11/1999 | Carter et al. |
| 6,003,635 A | 12/1999 | Bantz et al. |
| 6,006,201 A | 12/1999 | Berent et al. |
| 6,009,410 A | 12/1999 | Lemole et al. |
| 6,018,748 A | 1/2000 | Smith |
| 6,021,416 A | 2/2000 | Dauerer et al. |
| 6,021,426 A | 2/2000 | Douglis et al. |
| 6,026,433 A | 2/2000 | D'Arlach et al. |
| 6,041,310 A | 3/2000 | Green et al. |
| 6,041,344 A | 3/2000 | Bodamer et al. |
| 6,055,541 A | 4/2000 | Solecki et al. |
| 6,061,698 A | 5/2000 | Chadha et al. |
| 6,067,559 A | 5/2000 | Allard et al. |
| 6,070,164 A | 5/2000 | Vagnozzi |
| 6,134,532 A | 10/2000 | Lazarus et al. |
| 6,151,609 A | 11/2000 | Truong |
| 6,178,432 B1 | 1/2001 | Cook et al. |
| 6,181,994 B1 | 1/2001 | Colson et al. |
| 6,185,614 B1 | 2/2001 | Cuomo et al. |
| 6,189,104 B1 | 2/2001 | Leppek |
| 6,216,129 B1 | 4/2001 | Eldering |
| 6,219,667 B1 | 4/2001 | Lu et al. |
| 6,236,994 B1 | 5/2001 | Schwartz et al. |
| 6,240,365 B1 | 5/2001 | Bunn |
| 6,263,268 B1 | 7/2001 | Nathanson |
| 6,285,932 B1 | 9/2001 | De Belledeuille et al. |
| 6,289,382 B1 | 9/2001 | Bowman-Amuah |
| 6,295,061 B1 | 9/2001 | Park et al. |
| 6,330,499 B1 | 12/2001 | Chou et al. |
| 6,343,302 B1 | 1/2002 | Graham |
| 6,353,824 B1 | 3/2002 | Boguraev et al. |
| 6,356,822 B1 | 3/2002 | Diaz et al. |
| 6,374,241 B1 | 4/2002 | Lamburt et al. |
| 6,397,226 B1 | 5/2002 | Sage |
| 6,397,336 B2 | 5/2002 | Leppek |
| 6,401,103 B1 | 6/2002 | Ho et al. |
| 6,421,733 B1 | 7/2002 | Tso et al. |
| 6,473,849 B1 | 10/2002 | Keller et al. |
| 6,496,855 B1 | 12/2002 | Hunt et al. |
| 6,505,106 B1 | 1/2003 | Lawrence et al. |
| 6,505,205 B1 | 1/2003 | Kothuri et al. |
| 6,519,617 B1 | 2/2003 | Wanderski et al. |
| 6,529,948 B1 | 3/2003 | Bowman-Amuah |
| 6,535,879 B1 | 3/2003 | Behera |
| 6,539,370 B1 | 3/2003 | Chang et al. |
| 6,546,216 B2 | 4/2003 | Mizoguchi et al. |
| 6,553,373 B2 | 4/2003 | Boguraev et al. |
| 6,556,904 B1 | 4/2003 | Larson et al. |
| 6,564,216 B2 | 5/2003 | Waters |
| 6,571,253 B1 | 5/2003 | Thompson et al. |
| 6,581,061 B2 | 6/2003 | Graham |
| 6,583,794 B1 | 6/2003 | Wattenberg |
| 6,594,664 B1 | 7/2003 | Estrada et al. |
| 6,606,525 B1 | 8/2003 | Muthuswamy et al. |
| 6,629,148 B1 | 9/2003 | Ahmed et al. |
| 6,640,244 B1 | 10/2003 | Bowman-Amuah et al. |
| 6,643,663 B1 | 11/2003 | Dabney et al. |
| 6,654,726 B1 | 11/2003 | Hanzek |
| 6,674,805 B1 | 1/2004 | Kovacevic et al. |
| 6,678,706 B1 | 1/2004 | Fishel |
| 6,697,825 B1 | 2/2004 | Underwood et al. |
| 6,701,232 B2 | 3/2004 | Yamaki |
| 6,721,747 B2 | 4/2004 | Lipkin |
| 6,728,685 B1 | 4/2004 | Ahluwalia |
| 6,738,750 B2 | 5/2004 | Stone et al. |
| 6,744,735 B1 | 6/2004 | Nakaguro |
| 6,748,305 B1 | 6/2004 | Klausner et al. |
| 6,785,864 B1 | 8/2004 | Te et al. |
| 6,795,819 B2 | 9/2004 | Wheeler et al. |
| 6,823,258 B2 | 11/2004 | Ukai et al. |
| 6,823,359 B1 | 11/2004 | Heidingsfeld |
| 6,826,594 B1 | 11/2004 | Pettersen |
| 6,847,988 B2 | 1/2005 | Toyouchi et al. |
| 6,850,823 B2 | 2/2005 | Eun et al. |
| 6,871,216 B2 | 3/2005 | Miller et al. |
| 6,901,430 B1 | 3/2005 | Smith |
| 6,894,601 B1 | 5/2005 | Grunden et al. |
| 6,917,941 B2 | 7/2005 | Wight et al. |
| 6,922,674 B1 | 7/2005 | Nelson |
| 6,941,203 B2 | 9/2005 | Chen |
| 6,944,677 B1 | 9/2005 | Zhao |
| 6,954,731 B1 | 10/2005 | Montague et al. |
| 6,963,854 B1 | 11/2005 | Boyd et al. |
| 6,965,806 B2 | 11/2005 | Eryurek et al. |
| 6,965,968 B1 | 11/2005 | Touboul |
| 6,978,273 B1 | 12/2005 | Bonneau et al. |
| 6,981,028 B1 | 12/2005 | Rawat et al. |
| 6,990,629 B1 | 1/2006 | Heaney et al. |
| 6,993,421 B2 | 1/2006 | Pillar |
| 7,000,184 B2 | 2/2006 | Matveyenko et al. |
| 7,003,476 B1 | 2/2006 | Samra et al. |
| 7,010,495 B1 | 3/2006 | Samra et al. |
| 7,028,072 B1 | 4/2006 | Kliger et al. |
| 7,031,554 B2 | 4/2006 | Iwane |
| 7,039,704 B2 | 5/2006 | Davis et al. |
| 7,047,318 B1 | 5/2006 | Svedloff |
| 7,062,343 B2 | 6/2006 | Ogushi et al. |
| 7,062,506 B2 | 6/2006 | Taylor et al. |
| 7,072,943 B2 | 7/2006 | Landesmann |
| 7,092,803 B2 | 8/2006 | Kapolka et al. |
| 7,107,268 B1 | 9/2006 | Zawadzki et al. |
| 7,124,116 B2 | 10/2006 | Huyler |
| 7,152,207 B1 | 12/2006 | Underwood et al. |
| 7,155,491 B1 | 12/2006 | Schultz et al. |
| 7,171,418 B2 | 1/2007 | Blessin |
| 7,184,866 B2 | 2/2007 | Squires et al. |
| 7,197,764 B2 | 3/2007 | Cichowlas |
| 7,219,234 B1 | 5/2007 | Ashland et al. |
| 7,240,125 B2 | 7/2007 | Fleming |
| 7,246,263 B2 | 7/2007 | Skingle |
| 7,281,029 B2 | 10/2007 | Rawat |
| 7,287,000 B2 | 10/2007 | Boyd et al. |
| 7,322,007 B2 | 1/2008 | Schowtka et al. |
| 7,386,786 B2 | 6/2008 | Davis et al. |
| 7,401,289 B2 | 7/2008 | Lachhwani et al. |
| 7,406,429 B2 | 7/2008 | Salonen |
| 7,433,891 B2 | 10/2008 | Haber et al. |
| 7,457,693 B2 | 11/2008 | Olsen et al. |
| 7,477,968 B1 | 1/2009 | Lowrey |
| 7,480,551 B1 | 1/2009 | Lowrey et al. |
| 7,496,543 B1 | 2/2009 | Bamford et al. |
| 7,502,672 B1 | 3/2009 | Kolls |
| 7,536,641 B2 | 5/2009 | Rosenstein et al. |
| 7,548,985 B2 | 6/2009 | Guigui |
| 7,587,504 B2 | 9/2009 | Adams et al. |

(56) References Cited

U.S. PATENT DOCUMENTS

| | | |
|---|---|---|
| 7,590,476 B2 | 9/2009 | Shumate |
| 7,593,925 B2 | 9/2009 | Cadiz et al. |
| 7,593,999 B2 | 9/2009 | Nathanson |
| 7,613,627 B2 | 11/2009 | Doyle et al. |
| 7,620,484 B1 | 11/2009 | Chen |
| 7,624,342 B2 | 11/2009 | Matveyenko et al. |
| 7,657,594 B2 | 2/2010 | Banga et al. |
| 7,664,667 B1 | 2/2010 | Ruppelt et al. |
| 7,739,007 B2 | 6/2010 | Logsdon |
| 7,747,680 B2 | 6/2010 | Ravikumar et al. |
| 7,778,841 B1 | 8/2010 | Bayer et al. |
| 7,801,945 B1 | 9/2010 | Geddes et al. |
| 7,818,380 B2 | 10/2010 | Tamura et al. |
| 7,861,309 B2 | 12/2010 | Spearman et al. |
| 7,865,409 B1 | 1/2011 | Monaghan |
| 7,870,253 B2 | 1/2011 | Muilenburg et al. |
| 7,899,701 B1 | 3/2011 | Odom |
| 7,908,051 B2 | 3/2011 | Oesterling |
| 7,979,506 B2 | 7/2011 | Cole |
| 8,010,423 B2 | 8/2011 | Bodin et al. |
| 8,019,501 B2 | 9/2011 | Breed |
| 8,036,788 B2 | 10/2011 | Breed |
| 8,051,159 B2 | 11/2011 | Muilenburg et al. |
| 8,055,544 B2 | 11/2011 | Ullman et al. |
| 8,060,274 B2 | 11/2011 | Boss et al. |
| 8,095,403 B2 | 1/2012 | Price |
| 8,099,308 B2 | 1/2012 | Uyeki |
| 8,135,804 B2 | 3/2012 | Uyeki |
| 8,145,379 B2 | 3/2012 | Schwinke |
| 8,190,322 B2 | 5/2012 | Lin et al. |
| 8,209,259 B2 | 6/2012 | Graham, Jr. et al. |
| 8,212,667 B2 | 7/2012 | Petite et al. |
| 8,271,473 B2 | 9/2012 | Berg |
| 8,271,547 B2 | 9/2012 | Taylor et al. |
| 8,275,717 B2 | 9/2012 | Ullman et al. |
| 8,285,439 B2 | 10/2012 | Hodges |
| 8,296,007 B2 | 10/2012 | Swaminathan et al. |
| 8,311,905 B1 | 11/2012 | Campbell et al. |
| 8,355,950 B2 | 1/2013 | Colson et al. |
| 8,407,664 B2 | 3/2013 | Moosmann et al. |
| 8,428,815 B2 | 4/2013 | Van Engelshoven et al. |
| 8,438,310 B2 | 5/2013 | Muilenburg et al. |
| 8,448,057 B1 | 5/2013 | Sugnet |
| 8,521,654 B2 | 8/2013 | Ford et al. |
| 8,538,894 B2 | 9/2013 | Ullman et al. |
| 8,645,193 B2 | 2/2014 | Swinson et al. |
| 8,676,638 B1 | 3/2014 | Blair et al. |
| 8,725,341 B2 | 5/2014 | Ogasawara |
| 8,745,641 B1 | 6/2014 | Coker |
| 8,849,689 B1 | 9/2014 | Jagannathan et al. |
| 8,886,389 B2 | 11/2014 | Edwards et al. |
| 8,924,071 B2 | 12/2014 | Stanek et al. |
| 8,954,222 B2 | 2/2015 | Costantino |
| 8,996,230 B2 | 3/2015 | Lorenz et al. |
| 8,996,235 B2 | 3/2015 | Singh et al. |
| 9,014,908 B2 | 4/2015 | Chen et al. |
| 9,015,059 B2 | 4/2015 | Sims et al. |
| 9,026,304 B2 | 5/2015 | Olsen, III et al. |
| 9,047,722 B2 | 6/2015 | Kurnik et al. |
| 9,122,716 B1 | 9/2015 | Naganathan et al. |
| 9,165,413 B2 | 10/2015 | Jones et al. |
| 9,183,681 B2 | 11/2015 | Fish |
| 9,325,650 B2 | 4/2016 | Yalavarty et al. |
| 9,349,223 B1 | 5/2016 | Palmer |
| 9,384,597 B2 | 7/2016 | Koch et al. |
| 9,455,969 B1 | 9/2016 | Cabrera et al. |
| 9,477,936 B2 | 10/2016 | Lawson et al. |
| 9,577,866 B2 | 2/2017 | Rogers et al. |
| 9,596,287 B2 | 3/2017 | Rybak et al. |
| 9,619,945 B2 | 4/2017 | Adderly et al. |
| 9,659,495 B2 | 5/2017 | Modica et al. |
| 9,706,008 B2 | 7/2017 | Rajan et al. |
| 9,715,665 B2 | 7/2017 | Schondorf et al. |
| 9,754,304 B2 | 9/2017 | Taira et al. |
| 9,778,045 B2 | 10/2017 | Bang |
| 9,836,714 B2 | 12/2017 | Lander et al. |
| 9,983,982 B1 | 3/2018 | Kumar et al. |
| 10,032,139 B2 | 7/2018 | Adderly et al. |
| 10,083,411 B2 | 9/2018 | Kinsey et al. |
| 10,169,607 B1 | 1/2019 | Sheth et al. |
| 10,229,394 B1 | 3/2019 | Davis et al. |
| 10,448,120 B1 | 10/2019 | Bursztyn et al. |
| 10,475,256 B2 | 11/2019 | Chowdhury et al. |
| 10,509,696 B1 | 12/2019 | Gilderman et al. |
| 10,541,938 B1 | 1/2020 | Timmerman et al. |
| 10,552,871 B1 | 2/2020 | Chadwick |
| 10,657,707 B1 | 5/2020 | Leise |
| 11,080,105 B1 | 8/2021 | Birkett et al. |
| 11,117,253 B2 | 9/2021 | Oleynik |
| 11,190,608 B2 | 11/2021 | Amar et al. |
| 11,282,041 B2 | 3/2022 | Sanderford et al. |
| 11,322,247 B2 | 5/2022 | Bullington et al. |
| 11,392,855 B1 | 7/2022 | Murakonda et al. |
| 11,443,275 B1 | 9/2022 | Prakash et al. |
| 11,468,089 B1 | 10/2022 | Bales et al. |
| 11,507,892 B1 | 11/2022 | Henckel et al. |
| 2001/0005831 A1 | 6/2001 | Lewin et al. |
| 2001/0014868 A1 | 8/2001 | Herz et al. |
| 2001/0037332 A1 | 11/2001 | Miller et al. |
| 2001/0039594 A1 | 11/2001 | Park et al. |
| 2001/0054049 A1 | 12/2001 | Maeda et al. |
| 2002/0023111 A1 | 2/2002 | Arora et al. |
| 2002/0024537 A1 | 2/2002 | Jones et al. |
| 2002/0026359 A1 | 2/2002 | Long et al. |
| 2002/0032626 A1 | 3/2002 | Dewolf et al. |
| 2002/0032701 A1 | 3/2002 | Gao et al. |
| 2002/0042738 A1 | 4/2002 | Srinivasan et al. |
| 2002/0046245 A1 | 4/2002 | Hillar et al. |
| 2002/0049831 A1 | 4/2002 | Platner et al. |
| 2002/0052778 A1 | 5/2002 | Murphy et al. |
| 2002/0059260 A1 | 5/2002 | Jas |
| 2002/0065698 A1 | 5/2002 | Schick et al. |
| 2002/0065739 A1 | 5/2002 | Florance et al. |
| 2002/0069110 A1 | 6/2002 | Sonnenberg |
| 2002/0073080 A1 | 6/2002 | Lipkin |
| 2002/0082978 A1 | 6/2002 | Ghouri et al. |
| 2002/0091755 A1 | 7/2002 | Narin |
| 2002/0107739 A1 | 8/2002 | Schlee |
| 2002/0111727 A1 | 8/2002 | Vanstory et al. |
| 2002/0111844 A1 | 8/2002 | Vanstory et al. |
| 2002/0116197 A1 | 8/2002 | Erten |
| 2002/0116418 A1 | 8/2002 | Lachhwani et al. |
| 2002/0123359 A1 | 9/2002 | Wei et al. |
| 2002/0124053 A1 | 9/2002 | Adams et al. |
| 2002/0128728 A1 | 9/2002 | Murakami et al. |
| 2002/0129054 A1 | 9/2002 | Ferguson et al. |
| 2002/0133273 A1 | 9/2002 | Lowrey et al. |
| 2002/0138331 A1 | 9/2002 | Hosea et al. |
| 2002/0143646 A1 | 10/2002 | Boyden et al. |
| 2002/0154146 A1 | 10/2002 | Rodriquez et al. |
| 2002/0169851 A1 | 11/2002 | Weathersby et al. |
| 2002/0173885 A1 | 11/2002 | Lowrey et al. |
| 2002/0188869 A1 | 12/2002 | Patrick |
| 2002/0196273 A1 | 12/2002 | Krause |
| 2002/0198761 A1 | 12/2002 | Ryan et al. |
| 2002/0198878 A1 | 12/2002 | Baxter et al. |
| 2003/0014443 A1 | 1/2003 | Bernstein et al. |
| 2003/0023632 A1 | 1/2003 | Ries et al. |
| 2003/0033378 A1 | 2/2003 | Needham et al. |
| 2003/0036832 A1 | 2/2003 | Kokes et al. |
| 2003/0036964 A1 | 2/2003 | Boyden et al. |
| 2003/0037263 A1 | 2/2003 | Kamat et al. |
| 2003/0046179 A1 | 3/2003 | Anabtawi et al. |
| 2003/0051022 A1 | 3/2003 | Sogabe et al. |
| 2003/0055666 A1 | 3/2003 | Roddy et al. |
| 2003/0061263 A1 | 3/2003 | Riddle |
| 2003/0065532 A1 | 4/2003 | Takaoka |
| 2003/0065583 A1 | 4/2003 | Takaoka |
| 2003/0069785 A1 | 4/2003 | Lohse |
| 2003/0069790 A1 | 4/2003 | Kane |
| 2003/0074392 A1 | 4/2003 | Campbell et al. |
| 2003/0095038 A1 | 5/2003 | Dix |
| 2003/0101262 A1 | 5/2003 | Godwin |
| 2003/0115292 A1 | 6/2003 | Griffin et al. |

(56) References Cited

U.S. PATENT DOCUMENTS

| | | |
|---|---|---|
| 2003/0120502 A1 | 6/2003 | Robb et al. |
| 2003/0145310 A1 | 7/2003 | Thames et al. |
| 2003/0177050 A1 | 9/2003 | Crampton et al. |
| 2003/0177175 A1 | 9/2003 | Worley et al. |
| 2003/0225853 A1 | 12/2003 | Wang et al. |
| 2003/0229623 A1 | 12/2003 | Chang et al. |
| 2003/0233246 A1 | 12/2003 | Snapp et al. |
| 2004/0012631 A1 | 1/2004 | Skorski |
| 2004/0039646 A1 | 2/2004 | Hacker |
| 2004/0041818 A1 | 3/2004 | White et al. |
| 2004/0073546 A1 | 4/2004 | Forster et al. |
| 2004/0073564 A1 | 4/2004 | Haber et al. |
| 2004/0088228 A1 | 5/2004 | Mercer et al. |
| 2004/0093243 A1 | 5/2004 | Bodin et al. |
| 2004/0117046 A1 | 6/2004 | Colle et al. |
| 2004/0122735 A1 | 6/2004 | Meshkin et al. |
| 2004/0128320 A1 | 7/2004 | Grove et al. |
| 2004/0139203 A1 | 7/2004 | Graham, Jr. et al. |
| 2004/0148342 A1 | 7/2004 | Cotte |
| 2004/0156020 A1 | 8/2004 | Edwards |
| 2004/0163047 A1 | 8/2004 | Nagahara et al. |
| 2004/0181464 A1 | 9/2004 | Vanker et al. |
| 2004/0199413 A1 | 10/2004 | Hauser et al. |
| 2004/0220863 A1 | 11/2004 | Porter et al. |
| 2004/0225664 A1 | 11/2004 | Casement |
| 2004/0230897 A1 | 11/2004 | Latzel |
| 2004/0255233 A1 | 12/2004 | Croney et al. |
| 2004/0267263 A1 | 12/2004 | May |
| 2004/0268225 A1 | 12/2004 | Walsh et al. |
| 2004/0268232 A1 | 12/2004 | Tunning |
| 2005/0015491 A1 | 1/2005 | Koeppel |
| 2005/0021197 A1 | 1/2005 | Zimmerman et al. |
| 2005/0027611 A1 | 2/2005 | Wharton |
| 2005/0043614 A1 | 2/2005 | Huizenga et al. |
| 2005/0065804 A1 | 3/2005 | Worsham et al. |
| 2005/0096963 A1 | 5/2005 | Myr et al. |
| 2005/0108112 A1 | 5/2005 | Ellenson et al. |
| 2005/0114270 A1 | 5/2005 | Hind et al. |
| 2005/0114764 A1 | 5/2005 | Gudenkauf et al. |
| 2005/0108637 A1 | 6/2005 | Sahota et al. |
| 2005/0149398 A1 | 7/2005 | McKay |
| 2005/0171836 A1 | 8/2005 | Leacy |
| 2005/0176482 A1 | 8/2005 | Raisinghani et al. |
| 2005/0187834 A1 | 8/2005 | Painter et al. |
| 2005/0198121 A1 | 9/2005 | Daniels et al. |
| 2005/0228736 A1 | 10/2005 | Norman et al. |
| 2005/0256755 A1 | 11/2005 | Chand et al. |
| 2005/0267774 A1 | 12/2005 | Merritt et al. |
| 2005/0268282 A1 | 12/2005 | Laird |
| 2005/0289020 A1 | 12/2005 | Bruns et al. |
| 2005/0289599 A1 | 12/2005 | Matsuura et al. |
| 2006/0004725 A1 | 1/2006 | Abraido-Fandino |
| 2006/0031811 A1 | 2/2006 | Ernst et al. |
| 2006/0059253 A1 | 3/2006 | Goodman et al. |
| 2006/0064637 A1 | 3/2006 | Rechterman et al. |
| 2006/0123330 A1 | 6/2006 | Horiuchi et al. |
| 2006/0129423 A1 | 6/2006 | Sheinson et al. |
| 2006/0129982 A1 | 6/2006 | Doyle |
| 2006/0136105 A1 | 6/2006 | Larson |
| 2006/0161841 A1 | 7/2006 | Horiuchi et al. |
| 2006/0200751 A1 | 9/2006 | Underwood et al. |
| 2006/0224447 A1 | 10/2006 | Koningstein |
| 2006/0248205 A1 | 11/2006 | Randle et al. |
| 2006/0248442 A1 | 11/2006 | Rosenstein et al. |
| 2006/0265355 A1 | 11/2006 | Taylor |
| 2006/0271844 A1 | 11/2006 | Suklikar |
| 2006/0277588 A1 | 12/2006 | Harrington et al. |
| 2006/0282328 A1 | 12/2006 | Gerace et al. |
| 2006/0282547 A1 | 12/2006 | Hasha et al. |
| 2007/0005446 A1 | 1/2007 | Fusz et al. |
| 2007/0016486 A1 | 1/2007 | Stone et al. |
| 2007/0027754 A1 | 2/2007 | Collins et al. |
| 2007/0033087 A1 | 2/2007 | Combs et al. |
| 2007/0033520 A1 | 2/2007 | Kimzey et al. |
| 2007/0053513 A1 | 3/2007 | Hoffberg |
| 2007/0100519 A1 | 5/2007 | Engel |
| 2007/0150368 A1 | 6/2007 | Arora et al. |
| 2007/0209011 A1 | 9/2007 | Padmanabhuni et al. |
| 2007/0226540 A1 | 9/2007 | Konieczny |
| 2007/0250229 A1 | 10/2007 | Wu |
| 2007/0250327 A1 | 10/2007 | Hedy |
| 2007/0250840 A1 | 10/2007 | Coker et al. |
| 2007/0271154 A1 | 11/2007 | Broudy et al. |
| 2007/0271330 A1 | 11/2007 | Mattox et al. |
| 2007/0271389 A1 | 11/2007 | Joshi et al. |
| 2007/0282711 A1 | 12/2007 | Ullman et al. |
| 2007/0282712 A1 | 12/2007 | Ullman et al. |
| 2007/0282713 A1 | 12/2007 | Ullman et al. |
| 2007/0288413 A1 | 12/2007 | Mizuno et al. |
| 2007/0294192 A1 | 12/2007 | Tellefsen |
| 2007/0299940 A1 | 12/2007 | Gbadegesin et al. |
| 2008/0010561 A1 | 1/2008 | Bay et al. |
| 2008/0015921 A1 | 1/2008 | Libman |
| 2008/0015929 A1 | 1/2008 | Koeppel et al. |
| 2008/0027827 A1 | 1/2008 | Eglen et al. |
| 2008/0119983 A1 | 5/2008 | Inbarajan et al. |
| 2008/0172632 A1 | 7/2008 | Stambaugh |
| 2008/0189143 A1 | 8/2008 | Wurster |
| 2008/0195435 A1 | 8/2008 | Bentley et al. |
| 2008/0195932 A1 | 8/2008 | Oikawa et al. |
| 2008/0201163 A1 | 8/2008 | Barker et al. |
| 2008/0255925 A1 | 10/2008 | Vailaya et al. |
| 2009/0012887 A1 | 1/2009 | Taub et al. |
| 2009/0024918 A1 | 1/2009 | Silverbrook et al. |
| 2009/0043780 A1 | 2/2009 | Hentrich, Jr. et al. |
| 2009/0070435 A1 | 3/2009 | Abhyanker |
| 2009/0089134 A1 | 4/2009 | Uyeki |
| 2009/0106036 A1 | 4/2009 | Tamura et al. |
| 2009/0112687 A1 | 4/2009 | Blair et al. |
| 2009/0138329 A1 | 5/2009 | Wanker |
| 2009/0182232 A1 | 7/2009 | Zhang et al. |
| 2009/0187513 A1 | 7/2009 | Noy et al. |
| 2009/0187939 A1 | 7/2009 | Lajoie |
| 2009/0198507 A1 | 8/2009 | Rhodus |
| 2009/0204454 A1 | 8/2009 | Lagudi |
| 2009/0204655 A1 | 8/2009 | Wendelberger |
| 2009/0222532 A1 | 9/2009 | Finlaw |
| 2009/0265607 A1 | 10/2009 | Raz et al. |
| 2009/0313035 A1 | 12/2009 | Esser et al. |
| 2010/0011415 A1 | 1/2010 | Cortes et al. |
| 2010/0023393 A1 | 1/2010 | Costy et al. |
| 2010/0070343 A1 | 3/2010 | Taira et al. |
| 2010/0082778 A1 | 4/2010 | Muilenburg et al. |
| 2010/0082780 A1 | 4/2010 | Muilenburg et al. |
| 2010/0088158 A1 | 4/2010 | Pollack |
| 2010/0100259 A1 | 4/2010 | Geiter |
| 2010/0100506 A1 | 4/2010 | Marot |
| 2010/0131363 A1 | 5/2010 | Sievert et al. |
| 2010/0235219 A1 | 9/2010 | Merrick et al. |
| 2010/0235231 A1 | 9/2010 | Jewer |
| 2010/0293030 A1 | 11/2010 | Wu |
| 2010/0312608 A1 | 12/2010 | Shan et al. |
| 2010/0318408 A1 | 12/2010 | Sankaran et al. |
| 2010/0324777 A1 | 12/2010 | Tominaga et al. |
| 2011/0010432 A1 | 1/2011 | Uyeki |
| 2011/0015989 A1 | 1/2011 | Tidwell et al. |
| 2011/0022525 A1 | 1/2011 | Swinson et al. |
| 2011/0066557 A1 | 3/2011 | Bassin et al. |
| 2011/0082804 A1 | 4/2011 | Swinson et al. |
| 2011/0145064 A1 | 6/2011 | Anderson et al. |
| 2011/0161167 A1 | 6/2011 | Jallapuram |
| 2011/0191264 A1 | 8/2011 | Inghelbrecht et al. |
| 2011/0196762 A1 | 8/2011 | Dupont |
| 2011/0224864 A1 | 9/2011 | Gellatly et al. |
| 2011/0231055 A1 | 9/2011 | Knight et al. |
| 2011/0288937 A1 | 11/2011 | Manoogian, III |
| 2011/0307296 A1 | 12/2011 | Hall et al. |
| 2011/0307411 A1 | 12/2011 | Bolivar et al. |
| 2012/0066010 A1 | 3/2012 | Williams et al. |
| 2012/0089474 A1 | 4/2012 | Xiao et al. |
| 2012/0095804 A1 | 4/2012 | Calabrese et al. |
| 2012/0116868 A1 | 5/2012 | Chin et al. |
| 2012/0158211 A1 | 6/2012 | Chen et al. |
| 2012/0209714 A1 | 8/2012 | Douglas et al. |

(56) References Cited

U.S. PATENT DOCUMENTS

| | | |
|---|---|---|
| 2012/0221125 A1 | 8/2012 | Bell |
| 2012/0265648 A1 | 10/2012 | Jerome et al. |
| 2012/0268294 A1 | 10/2012 | Michaelis et al. |
| 2012/0278886 A1 | 11/2012 | Luna |
| 2012/0284113 A1 | 11/2012 | Pollak |
| 2012/0316981 A1 | 12/2012 | Hoover et al. |
| 2013/0046432 A1 | 2/2013 | Edwards et al. |
| 2013/0080196 A1 | 3/2013 | Schroeder et al. |
| 2013/0080305 A1 | 3/2013 | Virag et al. |
| 2013/0151334 A1 | 6/2013 | Berkhin et al. |
| 2013/0151468 A1 | 6/2013 | Wu et al. |
| 2013/0191445 A1 | 7/2013 | Gayman et al. |
| 2013/0204484 A1 | 8/2013 | Ricci |
| 2013/0226699 A1 | 8/2013 | Long |
| 2013/0317864 A1 | 11/2013 | Tofte et al. |
| 2013/0325541 A1 | 12/2013 | Capriotti et al. |
| 2013/0332023 A1 | 12/2013 | Bertosa et al. |
| 2014/0012659 A1 | 1/2014 | Yan |
| 2014/0026037 A1 | 1/2014 | Garb et al. |
| 2014/0052327 A1 | 2/2014 | Hosein et al. |
| 2014/0081675 A1 | 3/2014 | Ives et al. |
| 2014/0088866 A1 | 3/2014 | Knapp et al. |
| 2014/0094992 A1 | 4/2014 | Lambert et al. |
| 2014/0122178 A1 | 5/2014 | Knight |
| 2014/0136278 A1 | 5/2014 | Carvalho |
| 2014/0229207 A1 | 8/2014 | Swamy et al. |
| 2014/0229391 A1 | 8/2014 | East et al. |
| 2014/0244110 A1 | 8/2014 | Tharaldson et al. |
| 2014/0277906 A1 | 9/2014 | Lowrey et al. |
| 2014/0278805 A1 | 9/2014 | Thompson |
| 2014/0316825 A1 | 10/2014 | Van Dijk et al. |
| 2014/0324275 A1 | 10/2014 | Stanek et al. |
| 2014/0324536 A1 | 10/2014 | Cotton |
| 2014/0331301 A1 | 11/2014 | Subramani et al. |
| 2014/0337163 A1 | 11/2014 | Whisnant |
| 2014/0337825 A1 | 11/2014 | Challa et al. |
| 2014/0379530 A1 | 12/2014 | Kim et al. |
| 2014/0379817 A1 | 12/2014 | Logue et al. |
| 2015/0032546 A1 | 1/2015 | Calman et al. |
| 2015/0057875 A1 | 2/2015 | McGinnis et al. |
| 2015/0058151 A1 | 2/2015 | Sims et al. |
| 2015/0066781 A1 | 3/2015 | Johnson et al. |
| 2015/0066933 A1 | 3/2015 | Kolodziej et al. |
| 2015/0100199 A1 | 4/2015 | Kurnik et al. |
| 2015/0142256 A1 | 5/2015 | Jones |
| 2015/0142535 A1 | 5/2015 | Payne et al. |
| 2015/0207701 A1 | 7/2015 | Faaborg et al. |
| 2015/0227894 A1 | 8/2015 | Mapes, Jr. et al. |
| 2015/0242819 A1 | 8/2015 | Moses et al. |
| 2015/0248761 A1 | 9/2015 | Dong et al. |
| 2015/0254591 A1 | 9/2015 | Raskind |
| 2015/0268059 A1 | 9/2015 | Borghesani et al. |
| 2015/0268975 A1 | 9/2015 | Du et al. |
| 2015/0278886 A1 | 10/2015 | Fusz |
| 2015/0286475 A1 | 10/2015 | Vangelov et al. |
| 2015/0286979 A1 | 10/2015 | Ming et al. |
| 2015/0290795 A1 | 10/2015 | Oleynik |
| 2015/0334165 A1 | 11/2015 | Arling et al. |
| 2016/0004516 A1 | 1/2016 | Ivanov et al. |
| 2016/0059412 A1 | 3/2016 | Oleynik |
| 2016/0071054 A1 | 3/2016 | Kakarala et al. |
| 2016/0092944 A1 | 3/2016 | Taylor et al. |
| 2016/0132935 A1 | 5/2016 | Shen et al. |
| 2016/0140609 A1 | 5/2016 | Demir |
| 2016/0140620 A1 | 5/2016 | Pinkowish et al. |
| 2016/0140622 A1 | 5/2016 | Wang et al. |
| 2016/0148439 A1 | 5/2016 | Akselrod et al. |
| 2016/0162817 A1 | 6/2016 | Grimaldi et al. |
| 2016/0179968 A1 | 6/2016 | Ormseth et al. |
| 2016/0180358 A1 | 6/2016 | Battista |
| 2016/0180378 A1 | 6/2016 | Toshida et al. |
| 2016/0180418 A1 | 6/2016 | Jaeger |
| 2016/0267503 A1 | 9/2016 | Zakai-Or et al. |
| 2016/0275533 A1 | 9/2016 | Smith et al. |
| 2016/0277510 A1 | 9/2016 | Du et al. |
| 2016/0307174 A1 | 10/2016 | Marcelle et al. |
| 2016/0335727 A1 | 11/2016 | Jimenez |
| 2016/0337278 A1 | 11/2016 | Peruri et al. |
| 2016/0357599 A1 | 12/2016 | Glatfelter |
| 2016/0371641 A1 | 12/2016 | Wilson et al. |
| 2017/0034547 A1 | 2/2017 | Jain et al. |
| 2017/0039785 A1 | 2/2017 | Richter et al. |
| 2017/0053460 A1 | 2/2017 | Hauser et al. |
| 2017/0060929 A1 | 3/2017 | Chesla et al. |
| 2017/0064038 A1 | 3/2017 | Chen |
| 2017/0093700 A1 | 3/2017 | Gilley et al. |
| 2017/0124525 A1 | 5/2017 | Johnson et al. |
| 2017/0126848 A1 | 5/2017 | George et al. |
| 2017/0206465 A1 | 7/2017 | Jin et al. |
| 2017/0262894 A1 | 9/2017 | Kirti et al. |
| 2017/0293894 A1 | 10/2017 | Taliwal et al. |
| 2017/0308844 A1 | 10/2017 | Kelley |
| 2017/0308864 A1 | 10/2017 | Kelley |
| 2017/0308865 A1 | 10/2017 | Kelley |
| 2017/0316459 A1 | 11/2017 | Strauss et al. |
| 2017/0337573 A1 | 11/2017 | Toprak |
| 2017/0352054 A1 | 12/2017 | Ma et al. |
| 2017/0359216 A1 | 12/2017 | Naiden et al. |
| 2017/0364733 A1 | 12/2017 | Estrada et al. |
| 2018/0067932 A1 | 3/2018 | Paterson et al. |
| 2018/0074864 A1 | 3/2018 | Chen et al. |
| 2018/0095733 A1 | 4/2018 | Torman et al. |
| 2018/0108058 A1* | 4/2018 | Cotton .............. G06Q 30/0235 |
| 2018/0173806 A1 | 6/2018 | Forstmann et al. |
| 2018/0204281 A1 | 7/2018 | Painter et al. |
| 2018/0225710 A1 | 8/2018 | Kar et al. |
| 2018/0232749 A1 | 8/2018 | Moore, Jr. et al. |
| 2018/0285901 A1 | 10/2018 | Zackrone |
| 2018/0285925 A1 | 10/2018 | Zackrone |
| 2018/0300124 A1 | 10/2018 | Malladi et al. |
| 2019/0028360 A1 | 1/2019 | Douglas et al. |
| 2019/0073641 A1 | 3/2019 | Utke |
| 2019/0114330 A1 | 4/2019 | Xu et al. |
| 2019/0213426 A1 | 7/2019 | Chen et al. |
| 2019/0294878 A1 | 9/2019 | Endras et al. |
| 2019/0297162 A1 | 9/2019 | Amar et al. |
| 2019/0334884 A1 | 10/2019 | Ross et al. |
| 2020/0019388 A1 | 1/2020 | Jaeger et al. |
| 2020/0038363 A1 | 2/2020 | Kim |
| 2020/0050879 A1 | 2/2020 | Zaman et al. |
| 2020/0066067 A1 | 2/2020 | Herman et al. |
| 2020/0118365 A1 | 4/2020 | Wang et al. |
| 2020/0159525 A1 | 5/2020 | Bhalla et al. |
| 2020/0177476 A1 | 6/2020 | Agarwal et al. |
| 2020/0327371 A1 | 10/2020 | Sharma et al. |
| 2021/0072976 A1 | 3/2021 | Chintagunta et al. |
| 2021/0090694 A1 | 3/2021 | Colley et al. |
| 2021/0157562 A1 | 5/2021 | Sethi et al. |
| 2021/0184780 A1 | 6/2021 | Yang et al. |
| 2021/0224975 A1 | 7/2021 | Ranca et al. |
| 2021/0240657 A1 | 8/2021 | Kumar et al. |
| 2021/0256616 A1 | 8/2021 | Hayard et al. |
| 2021/0287106 A1 | 9/2021 | Jerram |
| 2021/0303644 A1 | 9/2021 | Shear |
| 2021/0350334 A1 | 11/2021 | Ave et al. |
| 2021/0359940 A1 | 11/2021 | Shen et al. |
| 2022/0020086 A1 | 1/2022 | Kuchenbecker et al. |
| 2022/0028928 A1 | 1/2022 | Seo et al. |
| 2022/0046105 A1 | 2/2022 | Amar et al. |
| 2022/0172723 A1 | 6/2022 | Tendolkar et al. |
| 2022/0191663 A1 | 6/2022 | Karpoor et al. |
| 2022/0208319 A1 | 6/2022 | Ansari et al. |
| 2022/0237084 A1 | 7/2022 | Bhagi et al. |
| 2022/0237171 A1 | 7/2022 | Bailey et al. |
| 2022/0293107 A1 | 9/2022 | Leaman et al. |
| 2022/0300735 A1 | 9/2022 | Kelly et al. |
| 2023/0214892 A1 | 7/2023 | Christian et al. |

OTHER PUBLICATIONS http://web.archive.org/web/20050305055408/http://www.dealerclick.com/, 1 pg.

(56) References Cited

OTHER PUBLICATIONS http:/web.archive.org/web/20050528073821/http://www.kbb.com/, 1 pg.
http://web.archive.org/web/20050531000823/http://www.carfax.com/, 1 pg.
Internet Archive Dan Gillmor Sep. 1, 1996.
Internet Archive Wayback Machine, archive of LDAP Browser.com—FAQ. Archived Dec. 11, 2000. Available at <http://web.archive.org/web/200012110152/http://www.ldapbrowser.com/faq/faq.php3?sID=fe4ae66f023d86909f35e974f3a1ce>.
Internet Archive Wayback Machine, archive of LDAP Browser.com—Product Info. Archived Dec. 11, 2000. Available at <http://web.archive.org/web/200012110541/http://www.ldapbrowser.com/prodinfo/prodinfo.php3?sID=fe4ae66f2fo23d86909f35e974f3a1ce>.
Internet Archive: Audio Archive, http://www.archive.org/audio/audio-searchresults.php?search=@start=0&limit=100&sort=ad, printed May 12, 2004, 12 pgs.
Internet Archive: Democracy Now, http://www.archive.org/audio/collection.php?collection=democracy_now, printed May 12, 2004, 2 pgs.
Java 2 Platform, Enterprise Edition (J2EE) Overview, printed Mar. 6, 2010, 3 pgs.
Java version history—Wikipedia, the free encyclopedia, printed Mar. 6, 2010, 9 pgs.
Permissions in the Java™ 2 SDK, printed Mar. 6, 2010, 45 pgs.
Trademark Application, Serial No. 76375405. 13 pages of advertising material and other application papers enclosed. Available from Trademark Document Retrieval system at.
Trademark Electronic Search System record for Serial No. 76375405, Word Mark "NITRA".
An Appointment with Destiny—The Time for Web-Enabled Scheduling has Arrived, Link Fall ,2007 ,2 pages.
How a Solution found a Problem of Scheduling Service Appointments, Automotive News ,2016 ,4 pages.
IBM Tivoli Access Manager Base Administration Guide, Version 5.1. International Business Machines Corporation. Entire book enclosed and cited. ,2003 ,402 pgs.
NetFormx Offers Advanced Network Discovery Software, PR Newswire. Retrieved from http://www.highbeam.com/doc/1G1-54102907.html>. ,Mar. 15, 1999.
Openbay Announces First-of-its-Kind Connected Car Repair Service, openbay.com , Mar. 31, 2015 , 14 pages.
Phelan,Mark et al.,Smart phone app aims to automate car repairs, Detroit Free Press Auto Critic ,Mar. 31, 2015 ,2 pages.
Pubnub Staff, et al.,Streaming Vehicle Data in Realtime with Automatic (Pt 1), Pubnub.com , Aug. 17, 2015 ,13 pages.
Standards for Technology in Auto, et al., https://www.starstandard.org/, retrieved Nov. 23, 2020 ,4 pages.
Strebe,Matthew et al., MCSE: NT Server 4 Study Guide, Third Edition. SYBEX Inc. Front matter ,2000 ,pp. 284-293, and 308-347.
Warren,Tamara et al.,This Device Determines What Ails Your Car and Finds a Repair Shop—Automatically, CarAndDriver.com ,Apr. 8, 2015 ,7 pages.
You,Song et al.,Overview of Remote Diagnosis and Maintenance for Automotive Systems, 2005 SAE World Congress ,Apr. 11-14, 2015 ,10 pages.
Service Advisor, Automotive Dealership Institute ,2007 ,26 pages.
XTime.com Web Pages, ,Jan. 8, 2015 ,1 page.
XTimes Newsletter, vol. 7 ,2013 ,4 pages.
Aloisio,Giovanni et al.,Web-based access to the Grid using the Grid Resource Broker portal, Google ,2002 ,pp. 1145-1160.
Anonymous, et al.,Software ready for prime time, Automotive News. Detroit, vol. 76, Issue 5996 ,Nov. 5, 2001 ,p. 28.
Bedell,Doug et al., Dallas Morning News, "I Know Someone Who Knows Kevin Bacon". Oct. 27, 1998. 4 pgs.
Chadwick,D.W et al.,Understanding X.500—The Directory, Available at <http://sec.cs.kent.ac.uk/x500book/>. Entire work cited.,1996.
Chatterjee,Pallab et al.,On-board diagnostics not just for racing anymore, EDN.com ,May 6, 2013 ,7 pages.
Chen,Deren et al.,Business to Business Standard and Supply Chain System Framework in Virtual Enterprises, Computer Supported Cooperative Work in Design, The Sixth International Conference on 2001 ,pp. 472-476.
Clemens Grelck, et al.,A Multithread Compiler Backend for High-Level Array Programming, ,2003.
CNY Business Journal, et al.,Frank La Voila named Southern Tier Small-Business Person of 1999, ,Jun. 11, 1999 ,2 pages.
Croswell,Wayne et al.,Service Shop Optimiztion, Modern Tire Retailer ,May 21, 2013 ,7 pages.
Davis,Peter T et al.,Sams Teach Yourself Microsoft Windows NT Server 4 in 21 Days, Sams® Publishing, ISBN: 0-672-31555-6,1999, printed Dec. 21, 2008 ,15 pages.
Derfler,Frank J. et al.,How Networks Work: Millennium Edition, Que, A Division of Macmillan Computer Publishing, ISBN: 0-7897-2445-6 ,2000 ,9 pages.
Drawbaugh, Ben et al.,Automatic Link Review: an expensive way to learn better driving habits, Endgadget.com ,Nov. 26, 2013 ,14 pages.
Emmanuel,Daniel et al.,Basics to Creating an Appointment System for Automotive Service Customers, Automotiveservicemanagement.com ,2006 ,9 pages.
Hogue, et al.,Thresher: Automating the Unwrapping of Semantic Content from the World Wide Web, ACM ,2005 ,pp. 86-95.
Housel,Barron C. et al.,WebExpress: A client/intercept based system for optimizing Web browsing in a wireless environment, Google ,1998 ,pp. 419-431.
Hu,Bo et al.,A Platform based Distributed Service Framework for Large-scale Cloud Ecosystem Development, IEEE Computer Society ,2015 ,8 pages.
Interconnection, et al., In Roget's II The New Thesaurus. Boston, MA: Houghton Mifflin http://www.credoreference.com/entry/hmrogets/interconnection ,2003, Retrieved Jul. 16, 2009 ,1 page.
Jenkins,Will et al.,Real-time vehicle performance monitoring with data intergrity, A Thesis Submitted to the Faculty of Mississippi State University ,Oct. 2006 ,57 pages.
Johns,Pamela et al.,Competitive intelligence in service marketing, Marketing Intelligence & Planning, vol. 28, No. 5 ,2010 ,pp. 551-570.
Lavrinc,Damon et al.,First Android-powered infotainment system coming to 2012 Saab 9-3, Autoblog.com ,Mar. 2, 2011 ,8 pages.
Lee,Adam J. et al.,Searching for Open Windows and Unlocked Doors: Port Scanning in Large-Scale Commodity Clusters, Cluster Computing and the Grid, 2005. IEEE International Symposium on vol. 1 ,2005 ,pp. 146-151.
Michener,J.R. et al.,Managing System and Active-Content Integrity, Computer, vol. 33, Issue: 7 ,2000 ,pp. 108-110.
Milic-Frayling,Natasa et al.,SmartView: Enhanced Document Viewer for Mobile Devices, Google ,Nov. 15, 2002 ,11 pages.
Needham,Charlie et al.,Google Now Taking Appointments for Auto Repair Shops, Autoshopsolutions.com ,Aug. 25, 2015 ,6 pages.
Open Bank Project, et al., https://www.openbankproject.com/, retrieved Nov. 23, 2020 ,10 pages.
openbay.com Web Pages, et al., Openbay.com, retrieved from archive.org May 14, 2019 ,Apr. 2015 ,6 pages.
openbay.com Web Pages, et al., Openbay.com, retrieved from archive.org on May 14, 2019 ,Feb. 2014 ,2 pages.
openbay.com Web Pages, et al., Openbay.com, retrieved from archive.org, May 14, 2019 ,Mar. 2015 ,11 pages.

\* cited by examiner

Digital Deal Jacket

[x] javascript:false

07:05:02 AM

Deal #103793 – GROVE CHARLIE and GROVE LIZ – Mar 01, 2021
LAPIS BLUE PEAR 2017 SUBARU LEGACY
Jacket Status: SIGNING    Contract Validated? NO
TOYOTA MOTOR CREDIT CORPORATION

200

Document Actions

| Review |
| Print |
| Scan/Upload |
| Remove |

Deal Jacket Documents                                                             Show Required Forms List

| | Document Description | Needs Signature | Status Date | Document Status | Sent to Lender |
|---|---|---|---|---|---|
| ☐ | Buyer's eSign Consent Document | Buyer | 06/18/21 11:30 | Needs Signing | |
| ☐ | Co-Buyer's eSign Consent Document | Co-Buyer | 06/18/21 11:30 | Needs Signing | |
| ☐ | Buyer's Final Signature Document | Buyer | 06/29/21 07:16 | Needs Signing | |
| ☐ | Co-Buyer's Final Signature Document | Co-Buyer | 06/29/21 07:16 | Needs Signing | |

202

Jacket Actions

| Sign |
| Send to Lender |
| Transmit History |
| Archive |
| Evidence Summary |

Removed Document List                    Add PDF or PNG    [Browse...]    [Close]  [Help]

FIG. 2

One Keystone

Field Definitions & Usage

New Field Definition

- View All Fields
- Create New Field

Name: InsuranceOtherDeduct... — 402
Label: Other insurance deduc... — 404
Type: String — 406
Domain: Deal — 408

Domain subcategory selection — 410
- Deal options: Buyer
- Buyer options: InsuranceInformation Submit Save Help

| | | | |
|---|---|---|---|
| One Keystone | | | Download XSD |
| View All Fields | | | |
| Create New Field | Field Definitions & Usage | | |
| | Field Definitions | | 🔍 |
| | Name | Label | Type | Domain | Category |
| | InsuranceOtherDeductibleName | Other insurance deductible name, if any... | String | Deal | Deal/Buyer/InsuranceInformation | ⊖ |
| | InsuranceContactPerson | Insurance contact person name: | String | Deal | Deal/Buyer/InsuranceInformation | ⊖ |
| | InsuranceOtherDeductibleAmount | Other insurance amount, if... | String | Deal | Deal/Buyer/InsuranceInformation | ⊖ |
| | InsuranceDaysUntilDeadline | Number of days remaining to execute... | String | Deal | Deal/Buyer/InsuranceInformation | ⊖ |
| | Rows per page: 10 ▼ | | 1-4 of 4 ⎹⟨ ⟨ Page 1 of 1 ⟩ ⟩⎹ |
| Help | | | |

500 — 502 — 504 — 506 — 508 — 510

Form Library – Deal 103793

Buyer Consent

◉ Buyer Consent to eSign  ○ Buyer does not consent to eSign

Form Library

Select the form(s) you want to send to the Digital Deal Jacket.

| | Form # | Form Name | Status |
|---|---|---|---|
| ☑ | 14565 | ODOMETER DISCLOSURE STATEMENT 804 | ✓ |
| ☐ | eF78 | 53047 DCAP Vehicle History Disclosure EDM | ✓ |
| ☐ | eF66 | 52991 DCAP Notice To CoSigner EDM | ✓ |
| ☐ | 66472 | DCAP Agreement To Arbitrate | ✓ |
| ☐ | 52992 | DCAP Insurance Coverage Acknowledgement | ✓ |
| ☐ | eF115 | 53055 DCAP CA Agreement to Provide Insurance | |
| ☐ | eF116 | 63233 Privacy Notice | |
| ☐ | 15*1*FI | Consent to do Business Electronically | |
| ☐ | 003*1*FI | Vickie's Trade Sheet | |
| ☐ | 0102*1*FI | Customer Control Card | |

Rows per page: 10 ▸   1-10 of 190   |◁ ◁ Page 1 of 1 ▷ ▷|

Selected Forms (4)
- eF115 – 53055 DCAP CA Agreement to... ✕
- eF116 – 63233 Privacy Notice ✕
- 9650*1*FI – AZ Est Native American Sta... ✕
- 18634*1*FI - Vickie's Trade Sheet ✕

[Review forms]

FIG. 8

< Review Selected Forms – Deal 103793

Prepare Forms

Selected Forms (4)

9650*1*FI-AZ Est Native American Status
18634*1*FI-Easy Care Gap Gold
eF115-53055 DCAP CA Agreement to P...
eF116-63233 Privacy Notice Prompt Details 9650*1*FI-AZ Est Native American Status  ✕

Enter Buyer's tribal card no.
115600

Enter Buyer's tribal name.
Apache

Enter CoBuyer's tribal card no.
11560

Enter CoBuyer's tribe name.
Apache

Save

18634*1*FI-Easy Care Gap Gold  ✕

Enter Buyer apartment number.
107

Save

Summary – Deal 103793

Forms Prepared

Check form statuses below and address issues as needed. Forms that printed successfully req[...]
Close returns to Drive or view the Digital Deal Jacket or return to the Forms Library.

Print Summary
Digital Deal jack...
Form Library

Forms

| Form # | Form Name | Status |
|---|---|---|
| 9650*1*FI | AZ Est Native American Status | |
| 18634*1*FI | Easy Care Gap Gold | (!) |
| eF115 | 53055 DCAP CA Agreement to Provide Insurance | |
| eF116 | 63233 Privacy Notice | |

Rows per page: 10    1-10 of 190    |<  <  Page 1 of 1  >  >|

FIG. 10

Digital Deal Jacket

[x] javascript:false

07:21:23 AM

Deal #103793 – GROVE CHARLIE and GROVE LIZ – Mar 01, 2021
LAPIS BLUE PEAR 2017 SUBARU LEGACY
Jacket Status: SIGNING  Contract Validated? NO
TOYOTA MOTOR CREDIT CORPORATION

1100

Document Actions
- Review
- Print
- Scan/Upload
- Remove

Deal Jacket Documents  — 1002

| | Document Description | Needs Signature | Status Date | Document Status | Sent to Lender |
|---|---|---|---|---|---|
| ☐ | Buyer's eSign Consent Document | Buyer | 06/18/21 11:30 | Needs Signing | |
| ☐ | Co-Buyer's eSign Consent Document | Co-Buyer | 06/18/21 11:30 | Needs Signing | |
| ☐ | AZ Est Native American Status | Buyer, Co-Buyer | 06/29/21 07:15 | Needs Signing | |
| ☐ | 53055 DCAP CA Agreement to Provide Insurance Insurance – Deal Copy | Buyer, Co-Buyer | 06/29/21 07:16 | Needs Signing | |
| ☐ | 63233 Privacy Notice – Deal Copy | Buyer, Co-Buyer | 06/29/21 07:16 | Needs Signing | |
| ☐ | Buyer's Final Signature Document | Buyer | 06/29/21 07:16 | Needs Signing | |
| ☐ | Co-Buyer's Final Signature Document | Co-Buyer | 06/29/21 07:16 | Needs Signing | |

1006  1008

☐ Show Required Forms List

Jacket Actions
- Sign
- Send to Lender
- Transmit History
- Archive
- Evidence Summary Add PDF or PNG [_____] Browse... Close Help ☐ Removed Document List

FIG. 11

CLOUD SERVICE PLATFORM INTEGRATION WITH DEALER MANAGEMENT SYSTEMS

BACKGROUND

Dealer management systems (DMSs) used by automotive dealers (herein sometimes referred to as "dealers") to manage workflow and other aspects involving the sale and/or purchasing of automotive inventory, among other aspects. A DMS may be, for example, a software service accessed by various users related to the operation the dealership in order to accomplish these workflows through/with the assistance of the DMS.

BRIEF SUMMARY

A cloud service platform may integrate over a network with an instance of a DMS used by an end user. The cloud service platform may define various fields that can be used in conjunction with forms that are used by the DMS, and may be further capable of storing field data for those fields. The cloud service platform may provide a graphical user interface (GUI) prompt to a user of the DMS to provide the field data. A form using the fields defined at the cloud service platform may be provided to the cloud service platform by the DMS and filled at the cloud service platform using field data for those fields stored at the cloud service platform. The form may then be provided to the user of the DMS.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 illustrates a DDJ generated by a print service, according to an embodiment.

FIG. 4 illustrates a field definition GUI for defining a field at a cloud service platform, according to an embodiment FIG. 5 illustrates a defined fields GUI showing field definitions present at a cloud service platform, according to an embodiment.

FIG. 8 illustrates a form library GUI that may be displayed to a user of a DMS, according to an embodiment.

FIG. 9 illustrates a DMS prompt GUI that may displayed to a user of the DMS, according to an embodiment.

FIG. 10 illustrates a form preparation summary GUI, according to an embodiment.

FIG. 11 illustrates a DDJ generated at a print service, according to an embodiment.

DETAILED DESCRIPTION

In some cases, a DMS may be useable to prepare and/or manage one or more forms (e.g., physical forms and/or electronic forms) that relate to a transaction (such as a purchase, sale, and/or lease; repair order; recall modification; etc.) about an automobile that occurs at dealership. A collection of such forms as they relate to a same transaction may be referred to herein as a "digital deal jacket" (DDJ). The relevant forms of the DDJ prepared and/or managed by/within the DMS may then be presented to the corresponding relevant parties (e.g., the dealership, the vehicle purchaser/seller/lessee, and/or any other related third parties such as insurers, financers, and/or governmental entities) for execution such that the transaction involving the vehicle can be effectuated.

Figure 1:
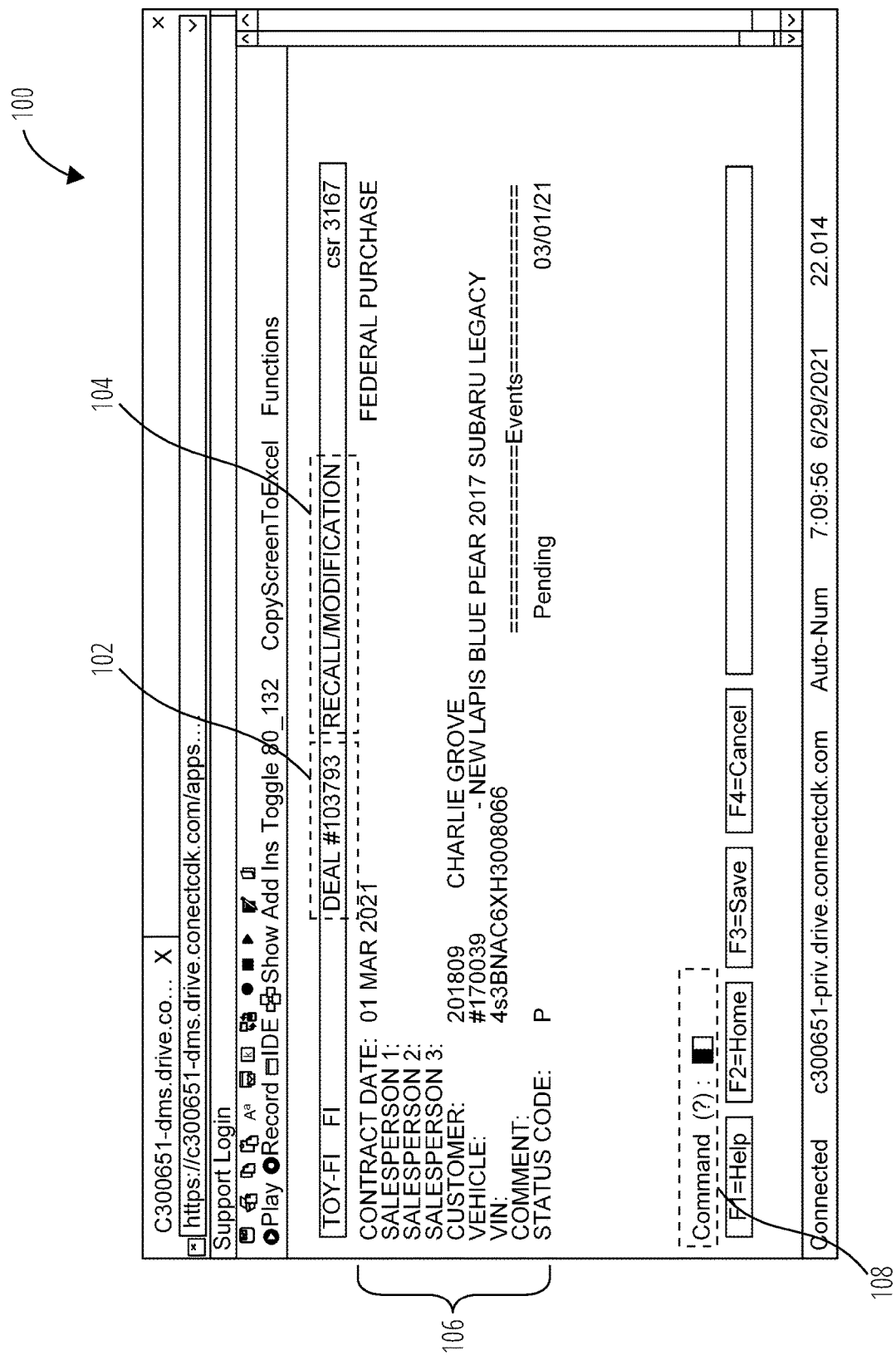
FIG. 1 illustrates a transaction screen of a DMS, according to an embodiment.

FIG. 1 illustrates a transaction screen 100 of a DMS, according to an embodiment. The transaction screen 100 may be presented to the user of a DMS in order to operate one or more workflows relative to a transaction or deal being managed by the DMS (and for which the DMS is being used to generate one or more forms of a related DDJ).

The transaction screen 100 includes, among other things, the transaction identifier 102, the transaction type 104, the transaction information 106, and the command prompt 108. The transaction identifier 102 may report a unique identifier for the current deal which is currently being operated on via the DMS.

The transaction type 104 reports a type for the present transaction. In the example of FIG. 1, the transaction type 104 is for a purchase (by the customer) of a vehicle, but other deal types (purchase by the dealership, lease by the dealership, etc.) could also be reflected in this field in appropriate corresponding cases.

The transaction information 106 related information about the transaction and/or about the vehicle that is the subject of the transaction. The transaction information 106 could include information beyond the information illustrated in FIG. 1 in alternative embodiments.

The command prompt 108 is provided to allow the user of the DMS to issue commands to the DMS. For example, it may be that the command prompt 108 could be used to instruct the DMS to generate a DDJ for the transaction, using the appropriate forms related to this transaction type and any field information know to the DMS corresponding to those forms. In some cases, this type of instruction may be given by, for example, the user of the DMS entering a "pf" command into the command prompt 108.

FIG. 2 illustrates a DDJ 200 generated at a print service, according to an embodiment. The DDJ 200 may be related to the transaction illustrated in the transaction screen 100 of FIG. 1. The print service may be a service provided at or by the DMS.

As illustrated, the DDJ 200 includes various forms 202. The forms 202 may be forms that use one or more fields known to the DMS. In other words, once appropriate field data (e.g., data for a field known to the DMS as entered by a user corresponding to a particular transaction) has been entered into the DMS for the fields known to the DMS, the DMS may automatically fill the forms based on the applications of the appropriate field data to the appropriate location on the form.

For example, if one of the forms 202 needs to be filled with the name of a buyer, and a field for the name of the buyer is present in the appropriate field of the DMS for the name of the buyer, the DMS may fill the form with the name of the buyer in the appropriate location prior to/upon presenting the form to a print service for inclusion as part of the DDJ 200 illustrated here.

DMS systems may support information input necessary to generate one or more forms through the use of user-enterable fields. These fields may relate to a wide variety of information that may be related to a transaction involving an automobile at a dealership operating the DMS. For example, the DMS may use fields for items of personal information for a purchaser/seller/lessee (e.g., names, birthdate, social security number, driver's license information, etc.), for insurance information for an automobile being sold/leased, financing institution information in the case financing is being used, payment processing information related to a given source of funds for effectuating the transaction, etc. Note that some or all of these (and many other) possibilities for information relevant to a transaction involving a vehicle may be enterable into a corresponding field managed by the DMS in various cases.

It has been recognized that, from time to time, it may become desirable to cause the DMS to function with additional fields (e.g., with one or more fields with which it is not currently configured to use). For example, a form used by the DMS may be changed to require a new and/or a different type of information that is not represented by any present field used by the DMS, and/or it may be that a new form is designed for the use with the DMS that requires or otherwise uses such new and/or different type of information that is not represented in any present field used by the DMS.

It has further been recognized that simply adding fields to a DMS directly can result in downstream issues. For example, because of the unknowable nature of the particular type of fields that may later be needed, some DMS systems are provided with (at the time of DMS instantiation) optional "auxiliary" fields that may be used by the dealership as such new fields as it becomes necessary to provide additional types of information to the DMS. However, these auxiliary fields of a DMS may be limited in various ways. For example, due to the "canned" nature of the these auxiliary fields, it may become ultimately necessary to rely on individual institutional knowledge (e.g., within the particular dealership) regarding what type of information is present in a given auxiliary field of that dealership's DMS instance. Further, multiple different dealerships may use different auxiliary fields of their respective instances of the DMS for different types of information, meaning that there is no guarantee of cross-entity consistency for auxiliary field use across different dealerships' instances of the DMS. This may make understanding the any auxiliary field of any particular DMS instance more difficult for entities that may work across such DMS instances, such as providers of the DMS software.

Other problems may arise in the case where auxiliary field usage at the DMS as has been described is not sufficient/suitable. This may occur, for example, in the case where many new fields are needed (e.g., in the case of expanding the DMS functionality to work with an additional form having these many new fields). In such cases, it may be that the DMS itself could be expanded to account for the fields of the new form (e.g., to fully integrate the new fields into the DMS, rather than using the limited number of auxiliary fields). In such cases, it may be necessary for a provider of the DMS software to modify the DMS instance used by the dealership to accordingly integrate the new fields. This represents additional burden for the DMS provider (particularly when considering that the provider may support multiple DMS instances across multiple dealerships that may each desire different changes of this kind).

Figure 3:
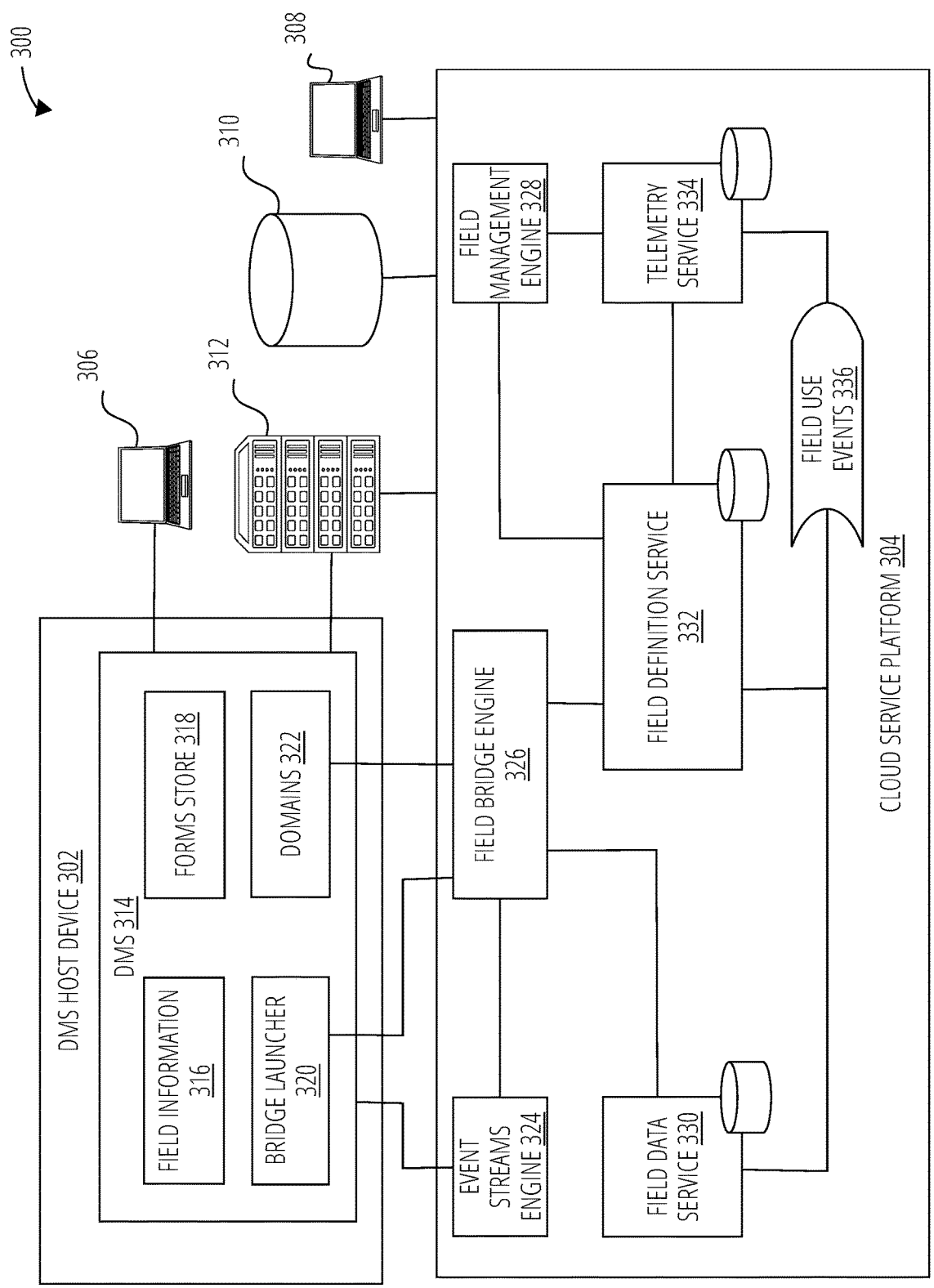
FIG. 3 illustrates a system for cloud management of field usage at a DMS, according to an embodiment.

FIG. 3 illustrates a system 300 for cloud management of field usage at a DMS, according to an embodiment. As illustrated, the system 300 includes a DMS host device 302, a cloud service platform 304, a first user device 306 (that is in communication with a DMS 314 on the DMS host device 302), a second user device 308 (that is in communication with the cloud service platform 304), a forms database 310 (that is in communication with the cloud service platform 304), and a print service 312 (that is in communication with each of the DMS host device 302 and the cloud service platform 304).

The DMS host device 302 may be a host device for an instance of a DMS 314 being used by a dealership.

The DMS 314 may include the field information 316. This field information 316 may correspond to one or more fields (including auxiliary fields) of the DMS 314 that is for one or more transactions being managed at the DMS 314 (e.g., as entered at some point into the DMS 314 by a user of the DMS 314 using the first user device 306 connected to the DMS host device 302 hosting the DMS 314), as described herein. The field information 316 may include/reflect definitions for such fields. The field information 316 may also include field data (e.g., as has been entered by a user of the first user device 306) for such fields.

The DMS host device 302 may further include a forms store 318. The forms store 318 may include one or more forms with which the DMS 314 is to operate.

The DMS 314 (or the DMS host device 302) may keep a record of any domains 322 used by the DMS 314. The domains 322 may correspond to and/or describe contexts for transactions that the DMS 314 is configured to operate for/handle. Examples of such domains may be a "deal" domain corresponding to the sale and/or purchase of a vehicle, a "repair" domain corresponding to a repair of the vehicle, a "credit" domain corresponding to a use of credit associated with an transaction, etc.

The fields used by the DMS may be associated with one or more of these domains (e.g., such that they are useable within their assigned domains). For example, fields related to the "credit" domain may include a field for the term of a loan, a field for the vehicle mileage, a field for a loan amount, etc.

The domains 322 useable with the DMS 314 may each use subcategories. For example, a "deal" domain may use a "finance institution" subcategory, a "buyer" subcategory, etc. Further, the use of subcategories under a domain may be layered. For example, the "buyer" subcategory may use an "InsuranceInformation" layer. These (layers of) subcategories accordingly act to categorize a field within its domain.

The DMS 314 includes a bridge launcher 320. The bridge launcher 320 may be a software interface between the DMS host device 302 and the cloud service platform 304. The bridge launcher 320 may be capable of providing the cloud service platform 304 with information from the DMS 314 (e.g., such as information from the field information 316 and/or the forms store 318) that is needed at the cloud service platform 304 for the operations of the cloud service platform 304, as will be described. The bridge launcher 320 may also be capable of receiving information at the DMS 314 from the cloud service platform 304.

The bridge launcher 320 may also be capable of displaying graphical user interfaces (GUIs) provided from the cloud service platform 304 to the user of the DMS 314 such that the user can interact with the cloud service platform 304 via the DMS 314.

The bridge launcher 320 may be capable of launching (e.g., beginning a process flow with) a field bridge engine 326 of the cloud service platform 304 (e.g., by sending a signal to the cloud service platform 304).

The cloud service platform 304 is a platform that is in communication (e.g., network communication) with the DMS host device 302 and which can interact with the DMS 314 hosted on the DMS host device 302.

The cloud service platform 304 may be used to expand upon the functionalities of the DMS 314. For example, the cloud service platform 304 may be configured to address issues regarding field use limitations that may exist at the DMS 314, as these are described herein. The cloud service platform 304 may be used to provide additional fields for use with the DMS 314 (e.g., beyond those that are provided directly within the DMS 314). Further, the cloud service platform 304 may communicate with the DMS 314 to provide for/enable the use of these additional fields (at the cloud service platform 304) in conjunction with the DMS 314. The cloud service platform 304 may accordingly help to overcome the problems discussed herein related to the difficulties and disadvantages of (instead) adding additional fields directly to the DMS 314.

The cloud service platform 304 includes an event streams engine 324, a field bridge engine 326, a field management engine 328, field data service 330, a field definition service 332 and a telemetry service 334.

The event streams engine 324 may receive data from the DMS 314, as illustrated. This data may include a form from the DMS 314 that is to be filled (at least in part) at the cloud service platform 304. This data may further include metadata for the fields of the form that is provided to the DMS 314. This data may further include field data for fields of the form that was already known to the DMS 314 and was filled to the form by the DMS 314 prior to the delivery of the form to the event streams engine 324.

Alternatively and/or additionally, the event streams engine 324 may receive a form from the forms store 318. The forms store 318 may include information about one or more forms operable within the cloud service platform 304. After retrieval, the cloud service platform 304 may be capable of filling one or more fields of the form, as described herein. Further, the cloud service platform 304 may be further capable of sending the form to the DMS 314 so that the DMS 314 can fill out further fields (e.g., fields that are managed at the DMS 314 instead of the cloud service platform 304).

The field bridge engine 326 communicates with the bridge launcher 320 of the DMS 314. In some cases, the field bridge engine 326 may operate in response to a signal from the bridge launcher 320. This signal from the bridge launcher 320 may have been generated via an operation of the bridge launcher 320 by a user of the DMS 314.

The field bridge engine 326 may receive and/or send information to/from the bridge launcher 320 of the DMS 314. Information that is sent to the bridge launcher 320 from the field bridge engine 326 may include a GUI having field label information and a field data input mechanism for a field of the cloud service platform 304. This field label information may be presented as part of the GUI as part of an integration of the GUI into a relevant workflow of the DMS 314. The field bridge engine 326 may also send field data that is known to the cloud service platform 304 to the DMS 314 (e.g., for display in the GUI, if it is the case that field data for the relevant field of the cloud service platform 304 already exists when generating the GUI).

The field bridge engine 326 may receive field information from the bridge launcher 320. This field information may be, for example, field data for a field that is defined and/or stored at the DMS 314.

As illustrated, the DMS 314 may provide information regarding the domains 322 to the field bridge engine 326. Once received at the field bridge engine 326, any field definitions created at the cloud service platform 304 for use with the DMS 314 can be assigned corresponding domain(s) that are consistent with the domains used at the DMS 314 (such that domain-wise organization of the fields is preserved and can be used across both the DMS 314 and the cloud service platform 304).

The field bridge engine 326 also communicates with the field data service 330 and the field definition service 332. The field bridge engine 326 may work with the field definition service 332 to retrieve field definition data as needed (e.g., such that the GUI prompting a user to enter field data corresponding to the field definition may be created at the field bridge engine 326 for providing to the bridge launcher 320).

The field bridge engine 326 may store and/or retrieve field data from the field data service 330. For example, in cases where the field bridge engine 326 provides a GUI to the bridge launcher 320 for entry of field data for a field of the cloud service platform 304, the field data may be entered by a user of the DMS 314 into the GUI via the first user device 306 and then communicated from the DMS 314 back to the field bridge engine 326. This field data may then be stored by the field bridge engine 326 in the field data service 330. In some cases where field data for the field is already known at the field data service 330, it may be retrieved by the field bridge engine 326 and pre-provided in the GUI.

The field bridge engine 326 may receive a form from the event streams engine 324 (e.g., that was provided to the event streams engine 324 by the DMS 314). The field bridge engine 326 may then use retrieved field data to fill in one or more fields of the form. The field data may be retrieved from the field data service 330 of the cloud service platform 304, from the DMS 314 (in the case that the DMS 314 stores the field in the field information 316 and has not already filled in the field on the form), and/or a user of the first user device 306 (in the event that neither the cloud service platform 304 nor the DMS 314 has the field data). This may be done by matching an indication of the metadata for the fields of the form (e.g., as was provided to the event streams engine 324 by the DMS 314) to the metadata for the retrieved field data (e.g., as defined in the field definition service 332). For example, the metadata for the retrieved field data may match a field definition for the field that is an XSD file that is used to map fields to forms. Such an XSD file may be stored at the forms database 310 and provided to the cloud service platform 304 for the uses discussed herein from the forms database 310. The forms 202 may be stored in the cloud rather than on the DMS 314. The DMS 314 contains the instance values for each data item. Each data item includes the variable and the content of the variable and sends the information to the DMS 314.

The field management engine 328 may be operated by a user of the cloud service platform 304. A user of the cloud service platform 304 (which may be the same or a different user than the user of the DMS 314) may control the cloud service platform 304 via the second user device 308. (or, alternatively, by using the first user device 306).

The field management engine 328 may be used to define fields used by the system 300 and store them into the field definition service 332. For example, a user of the cloud service platform 304 may define metadata for the field, such as a type of data that is stored in the field, a label for the field, a domain of the field, etc. This may be done by, for example, a user of the second user device 308 that is, for example, managing the cloud service platform 304 directly. Some or all of this metadata may be added by the field management engine 328 to an XSD file that is used to map fields to forms within the system 300.

The field management engine 328 may also provide generated field definitions to the telemetry service 334, such that the telemetry service 334 is enabled to recognize the use of fields so defined at the cloud service platform 304.

The field data service 330 may store and/or provide field data for fields of the cloud service platform 304 to other elements of the cloud service platform 304, as is described herein. Further, the field data service 330 may work in conjunction with the field definition service 332 to report any field use events 336 to the telemetry service 334. For example, the field data service 330 may indicate to the telemetry service 334 that a field has been used when the field is used.

The field definition service 332 may store field definitions for fields of the cloud service platform 304. A field definition may include, among other things, metadata for the field such as a type of data that is stored in the field, a label for the field, a domain of the field, etc. These definitions may be stored and/or provided to other elements of the cloud service platform 304 as is described herein.

Further, the field definition service 332 may work in conjunction with the field data service 330 to report any field use events 336 to the telemetry service 334. As part of this process, the field definition service 332 may provide field definitions to the telemetry service 334 to enable the telemetry service 334 to recognized fields that are used.

The telemetry service 334 may store records of how the fields of the cloud service platform 304 are used (e.g., where they are used, how often they are used, etc.). The telemetry service 334 may be capable of presenting these records for review by a user of the cloud service platform 304.

The print service 312 may receive one or more forms from either/both of the DMS 314 and/or the cloud service platform 304 and arrange them within a DDJ, as has been described. The print service 312 may further handle the output (printing, downloading, etc.) of the DDJ to a user (e.g., via the DMS 314 and to the first user device 306).

It is noted that while the print service 312 has been illustrated in the embodiment of FIG. 3 as separate from the DMS host device 302 and the cloud service platform 304, in some embodiments it may be the case that the print service 312 is instead part of the DMS 314 of the DMS host device 302, or otherwise hosted at the DMS host device 302. In such cases, the interactions of the cloud service platform 304 with the print service 312 as described herein may occur via the DMS 314.

FIG. 4 illustrates a field definition GUI 400 for defining a field at a cloud service platform, according to an embodiment. This field definition GUI 400 may be generated by the field management engine 328 and presented to a user of the second user device 308. In other embodiments, the field definition GUI 400 may instead be presented (via the DMS 314) to a user of the first user device 306. As the field definition GUI 400 is used and submitted back to the field management engine 328, the field management engine 328 may work with the field definition service 332 to store the new field as defined by user input in the field definition GUI 400 at the field definition service 332 for use with the cloud service platform 304.

The field definition GUI 400 allows the user to enter a field name 402. The field name 402 may be used in the system 300 to identify the field within the system 300. In this case, the user has entered "InsuranceOtherDeductibleName" as the field name 402.

The field definition GUI 400 allows the user to enter a field label 404. The field label 404 may be a label that is presented to a user (e.g., of the first user device 306) when the field is used. In this case, the user has entered "Other insurance deductible name, if any:" as the field label 404.

The field definition GUI 400 allows the user to indicate a data type 406 of the field. This data type 406 defines the type of data that can be entered into the field by users of the field. In this case, the user has entered indicated that the field has a data type 406 of "String."

The field definition GUI 400 allows the user to indicate a domain 408 of the field. This domain may be one of the domains known to the DMS 314 (e.g., that is one of the domains 322 of the DMS 314, as has been communicated to the cloud service platform 304). In this case, the user has entered indicated that relevant domain 408 is "Deal."

The field definition GUI 400 allows the user to indicate one or more domain subcategory selections 410. These domain subcategory selections 410 may be used to further organize the field within the cloud service platform 304 corresponding to the provided domain 408. At a first layer, the user selected "Buyer" as the subcategory option directly under the domain level of "Deal" (as previously selected by the user as described). In response to the selection of "Buyer," the field definition GUI 400 presents the "Buyer options" selection option, to which the user selects "InsuranceInformation" as illustrated. Accordingly, an appropriate set of layered subcategories for this new field within the "Deal" domain is established (e.g., Deal/Buyer/InsuranceInformation).

FIG. 5 illustrates a defined fields GUI 500 showing field definitions present at a cloud service platform 304, according to an embodiment. This defined fields GUI 500 may be generated by the field management engine 328 and presented to a user of the second user device 308.

After fields are defined to the cloud service platform (e.g., in the manner described in relation to FIG. 4), the defined fields GUI 500 may be used to review the field definitions 502.

As can be seen, the defined fields GUI 500 illustrates, among others, the first field definition 504. The first field definition 504 represents the particular field definition provided to the cloud service platform 304 by the field definition GUI 400 as discussed by way of example in FIG. 4—as can be seen, this name of this field is "InsuranceOtherDeductibleName," the label associated with the field is "Other insurance deductible name, if any:", the associated data type is "String," the domain is "Deal," and the set of layered subcategories within the Deal domain is expressed as "Deal/Buyer/InsuranceInformation."

The second field definition 506, third field definition 508 and fourth field definition 510 of the field definitions 502 are also seen here, as these have been defined to the cloud service platform 304 (e.g., by a user using a field definition GUI similar to the field definition GUI 400 given by way of example in FIG. 4).

A user may click one of the field definitions 502 in order to modify it. In such a case, the field definition GUI (such as described in FIG. 4) is populated with the current information and provided to the user, and can be used by the user to effectuate any desired changes to that field definition.

Figure 6:
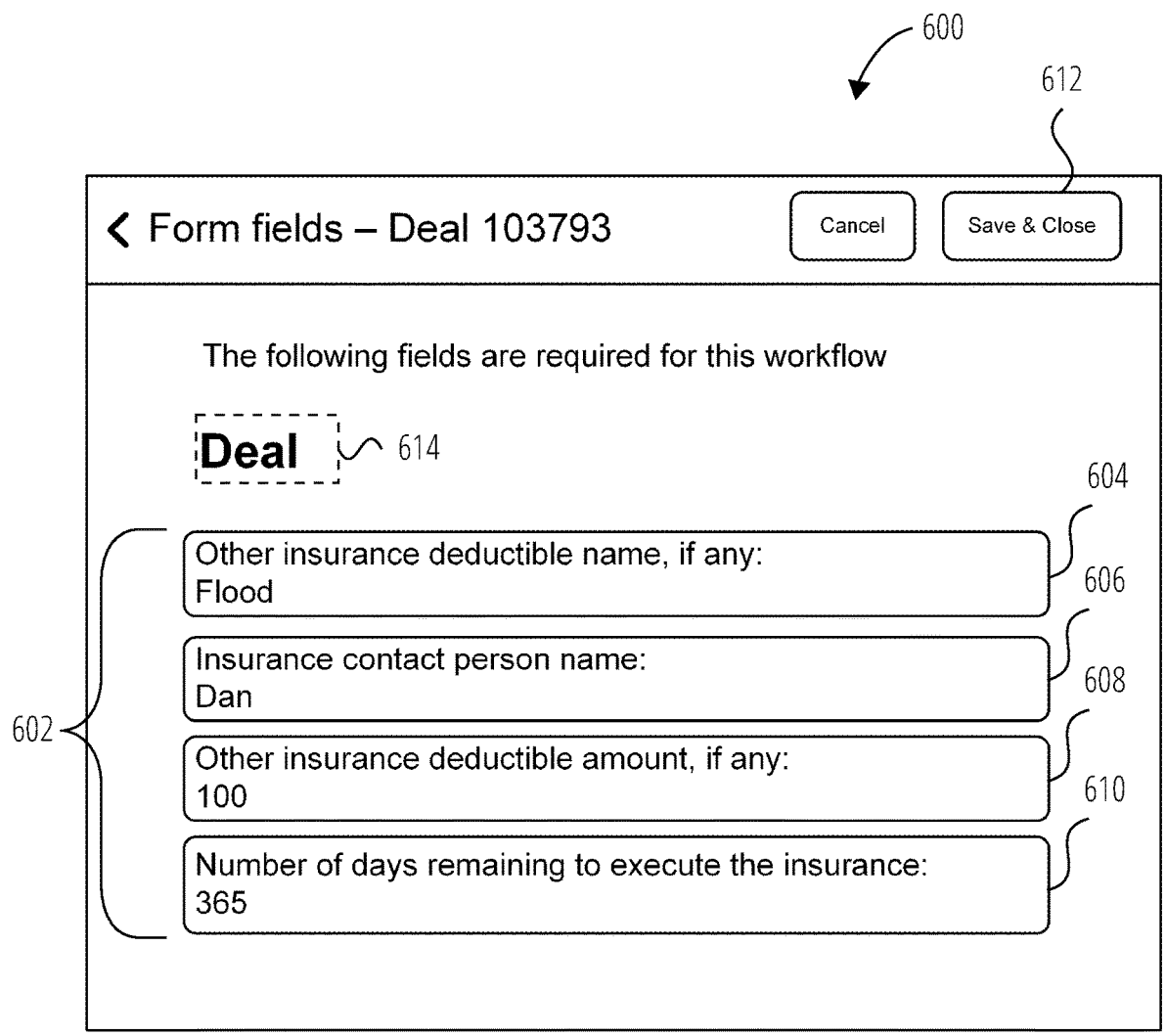
FIG. 6 illustrates a field fill GUI used by a user of a DMS to fill in fields defined at the cloud service platform as part of a workflow at a DMS, according to an embodiment.

FIG. 6 illustrates a field fill GUI 600 used by a user of a DMS 314 to fill in fields defined at the cloud service platform 304 as part of a workflow at a DMS 314, according to an embodiment. As is described herein, the cloud service platform 304 (e.g., using a field bridge engine 326) may provide the field fill GUI 600 to the bridge launcher 320 of the DMS 314. From there, the field fill GUI 600 may be provided to the user of the DMS 314 at a first user device 306. This field fill GUI 600 may act as a prompt to the user to provide field data to the system 300.

As illustrated, the field fill GUI 600 provides a number of fields 602 for the user to fill in. These fields 602 may correspond to field definitions present at the cloud service platform 304. For example, as will be seen upon review, the fields 602 of FIG. 6 correspond to the field definitions 502 of FIG. 5.

As a more particular example, it will be seen that the first field 604 corresponds to the first field definition 504 of FIG. 5. As can be seen, upon presentation to the user of the DMS 314, the first field 604 is presented with the label "Other insurance deductible name, if any:" as is provided per the first field definition 504. The user has inputted the string "Flood" as field data for the first field 604 consistent with the field type of "String" corresponding used by the first field definition 504.

Upon referencing FIG. 5, it will be seen that each of the second field 606, the third field 608, and the fourth field 610 correspond to the remainder of the field definitions 502 of FIG. 5 (other than the first field definition 504) in an analogous manner. The second field 606 corresponds to the second field definition 506 and accordingly uses the label "Insurance contact person name:". Here, the user has provided the string value "Dan" as field data. The third field 608 corresponds to the third field definition 508 and accordingly uses the label "Other insurance deductible amount, if any:". Here, the user has provided the string value "100" as field data. The fourth field 610 corresponds to the fourth field definition 510 and accordingly uses the label "Number of days remaining to execute the insurance:". Here, the user has provided the string value "365" as field data.

As illustrated, the fields 602 may be organized according to the one or more domains for those fields 602. For example, in FIG. 6, the fields 602 are organized per the "Deal" domain 614 (to which they all belong, as can be seen in reference to the first field definition 504, the second field definition 506, the third field definition 508, and the fourth field definition 510 of FIG. 5).

Once the field fill GUI 600 is filled in by the user, the field data may be taken from the field fill GUI 600 in order to be used with one or more forms that uses the fields 602 for which the field data was provided, as described herein. This action may be initiated by the user clicking the button 612 or taking some other action with the system that is configured to indicate to the system that the filling of the fields 602 by the user has been performed.

Figure 7A:
FIG. 7A and FIG. 7B together illustrate a form GUI for a form that uses fields defined at the cloud service platform, according to an embodiment.
Figure 7B:

FIG. 7A and FIG. 7B together illustrate a form GUI 700 for a form 702 that uses fields defined at the cloud service platform 304, according to an embodiment. FIG. 7A and FIG. 7B each show the form GUI 700 as scrolled to a different location of the form 702. The form 702 may be received at the cloud service platform 304 from the DMS 314.

The form 702 uses the first field 604, the second field 606, the third field 608, and the fourth field 610 from the cloud service platform 304 in the indicated locations. As can be seen, the user provided field data corresponding to each of these fields (e.g., as was provided by way of example in FIG. 6) has been added to the form 702 (e.g., by the cloud service platform 304) in the corresponding locations. This may be performed by determining that there are XSD definitions corresponding to the first field 604, the second field 606, the third field 608, and the fourth field 610 that map to the form at the indicated locations.

It is noted that the form 702 may also use fields that are defined by the DMS directly (and that have relevant field data stored directly at the DMS). For example, DMS-stored field data (corresponding to fifth field 704 for customer name(s) that is defined at the DMS) has been used in the form 702. This fifth field 704 may have been filled in the form 702 by the DMS 314 separately from (e.g., prior to) any involvement by the cloud service platform 304.

FIG. 8 illustrates a form library GUI 800 that may be displayed to a user of the DMS 314, according to an embodiment. The form library GUI 800 may allow the user to select one or more forms to be used as part of a DDJ. A forms listing 802 may detail the forms that can be selected by the user. The form library GUI 800 may be generated by the cloud service platform 304. The form library GUI 800 may be a combined list that includes information about forms stored in the forms store 318 on the DMS 314 (where this information may be provided from the DMS 314 to the cloud service platform 304) and forms on the forms database 310 (as determined based on communications between the forms database 310 and the cloud service platform 304).

As part of the of the forms listing 802, status indicators 804 corresponding to each of the forms may relate whether the form has already been successfully generated/filled, whether no action has yet been taken to generate/fill a form, whether there was an issue with a previous attempt to generate/fill a form, etc.

Once selected from the forms listing 802, the forms may be added to the selected forms list 806. These are forms that the system 300 will attempt to generate/fill. For each of the forms in the selected forms list 806, the system 300 may fill one or more fields in forms that are defined at the DMS 314 and/or the cloud service platform 304, as described herein. To the extent that the necessary field data is not found in the DMS 314 and/or the cloud service platform 304 per those field definitions, the system 300 may prompt the user for this field data, as described herein.

FIG. 9 illustrates a DMS prompt GUI 900 that may displayed to a user of the DMS 314, according to an embodiment. In the event that a form is used (e.g., selected as in FIG. 8) that uses one or more fields stored at the DMS 314 and for which appropriate field data has not yet been provided at the DMS 314, the cloud service platform 304 may use the DMS prompt GUI 900 to prompt the user for the information for those fields, as illustrated. For example, the DMS 314 may communicate to the cloud service platform 304 that is missing the necessary field data. The cloud service platform 304 may respond by generating the DMS prompt GUI 900 and presenting it to the user of the first user device 306 via the DMS 314. Once the user provides the input, it may be returned from the cloud service platform 304 to the DMS 314 and stored within the DMS 314.

FIG. 10 illustrates a form preparation summary GUI 1000, according to an embodiment. The form preparation summary GUI 1000 corresponds to the first form 1002, the second form 1004, the third form 1006, and the fourth form 1008 that were selected per the selected forms list 806 of FIG. 8.

As can be seen in reference to the status indicators 1010, the first form 1002, the third form 1006, and the fourth form 1008 were successfully prepared. Further, per the status indicators 1010, the second form 1004 was not successfully prepared.

Any successfully prepared forms may, in some embodiments, be added to a DDJ. FIG. 11 illustrates a DDJ 1100 generated at a print service 312, according to an embodiment. The DDJ 1100 is a modified version of the DDJ 200 of FIG. 2. As can be seen, the first form 1002, the third form 1006, and the fourth form 1008 (which were successfully prepared as described) are now present in the DDJ 1100.

Figure 12:
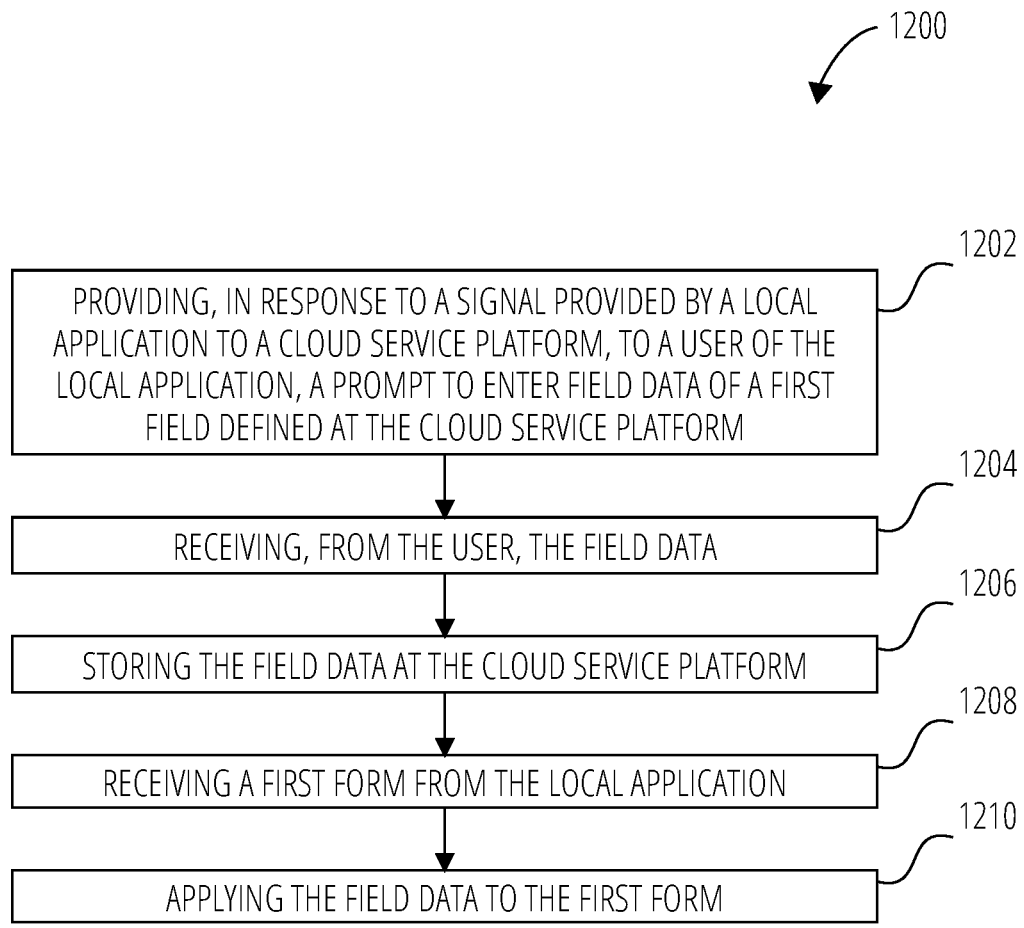
FIG. 12 illustrates a method of a cloud service platform for integrating with a local application operating on a remote device, according to an embodiment.

FIG. 12 illustrates a method 1200 of a cloud service platform for integrating with a local application operating on a remote device, according to an embodiment. The method 1200 includes providing, in response to a signal provided by the local application to the cloud service platform, to a user of the local application, a prompt to enter field data of a first field defined at the cloud service platform.

The method 1200 further includes receiving, from the user, the field data.

The method 1200 further includes storing the field data at the cloud service platform.

The method 1200 further includes receiving a first form from the local application.

The method 1200 further includes applying the field data to the first form.

In some embodiments, the method 1200 further includes receiving a second form from a forms database and applying the field data to a second form. In some of these embodiments, the method 1200 further includes providing the first form and the second form to a print service.

In some embodiments, the method 1200 further includes receiving a second form from the local application and applying the field data to the second form. In some of these embodiments, the method 1200 further includes providing the first form and the second form to a print service.

In some embodiments of the method 1200, the prompt to enter the field data is organized according to a domain of the first field.

In some embodiments, the method 1200 further includes recording that the field data was applied to the first form in telemetry data for the cloud service platform.

Figure 13:
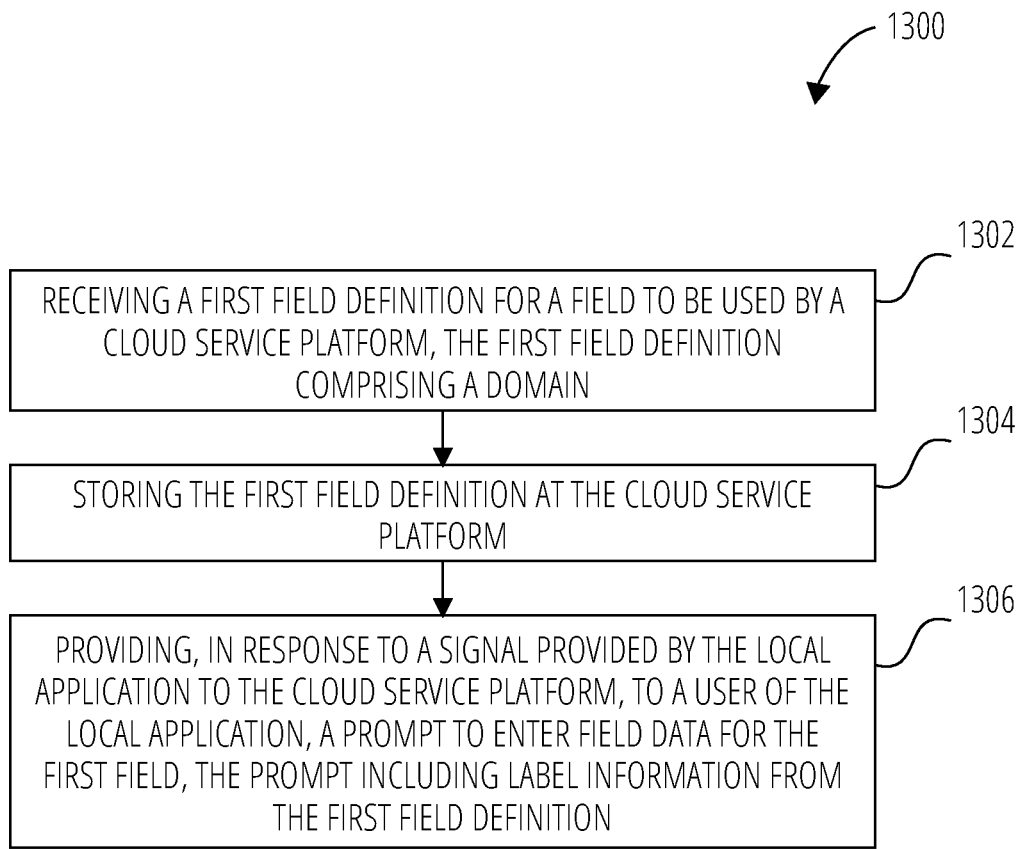
FIG. 13 illustrates a method of a cloud service platform for integrating with a local application operating on a remote device, according to an embodiment.

FIG. 13 illustrates a method 1300 of a cloud service platform for integrating with a local application operating on a remote device, according to an embodiment. The method 1300 includes receiving a first field definition for a field to be used by the cloud service platform, the first field definition comprising a domain.

The method 1300 further includes storing the first field definition at the cloud service platform.

The method 1300 further includes providing, in response to a signal provided by the local application to the cloud service platform, to a user of the local application, a prompt to enter field data for the first field, the prompt including label information from the first field definition.

In some embodiments of the method 1300, the first field definition further comprises metadata, and wherein the metadata for the first field definition is displayed within the prompt to enter field data for the first field.

In some embodiments of the method 1300, the prompt to enter the field data is organized according to the domain of the first field.

In some embodiments of the method 1300, the domain is a domain recognized by the local application.

In some embodiments, the method 1300 further includes receiving, from the local application, the field data; and storing the field data at the cloud service platform.

In some embodiments, the method 1300 further includes receiving, from the local application, the field data; and applying the field data to a form.

Figure 14:
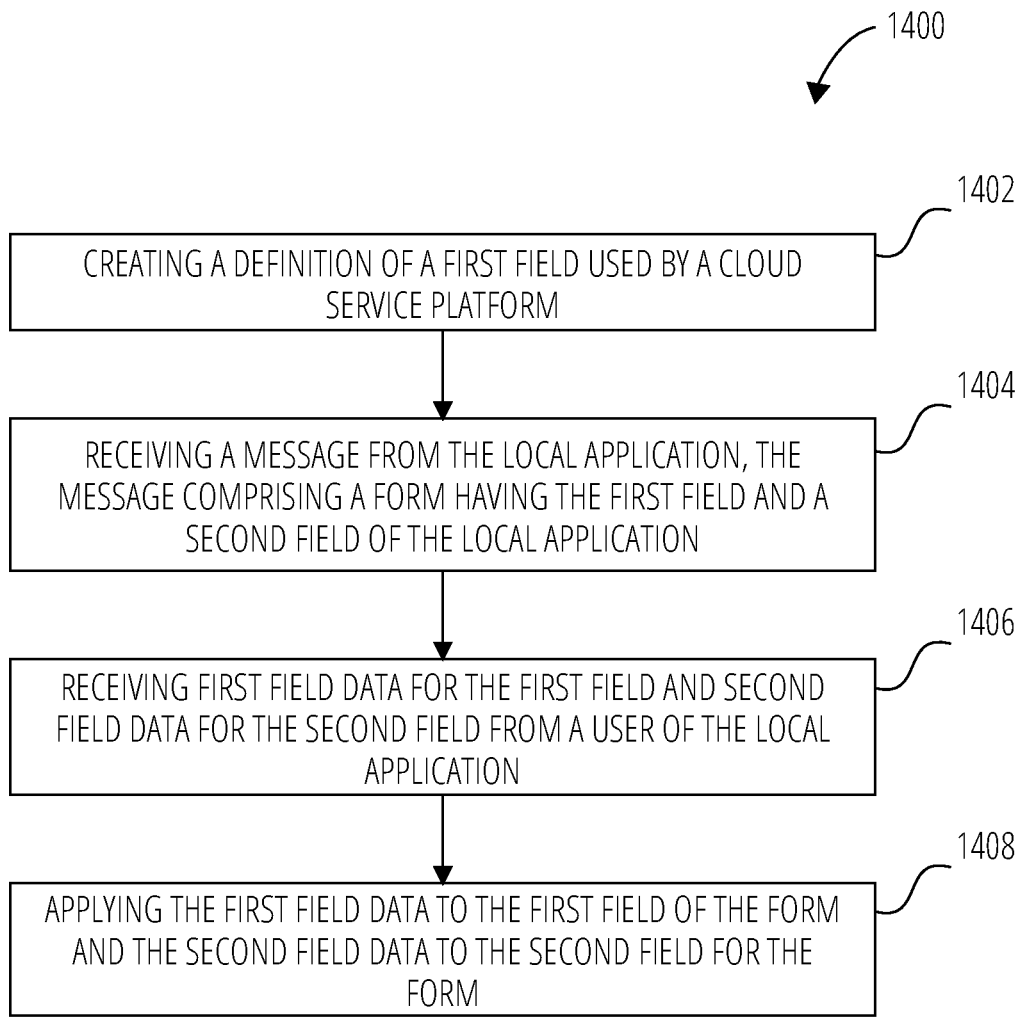
FIG. 14 comprises a method of a cloud service platform for integrating with a local application operating on a remote device, according to an embodiment.

FIG. 14 comprises a method 1400 of a cloud service platform for integrating with a local application operating on a remote device, according to an embodiment. The method 1400 includes creating a definition of a first field used by a cloud service platform.

The method 1400 further includes receiving a message from the local application, the message comprising a form having the first field and a second field of the local application.

The method 1400 further includes receiving first field data for the first field and second field data for the second field from a user of the local application The method 1400 further includes applying the first field data to the first field of the form and the second field data to the second field for the form In some embodiments of the method 1400, the first field data for the first field is applied to the form according to a workflow for the form, the workflow being provided to the cloud service platform by the local application.

In some embodiments of the method 1400, a field management engine of the cloud service platform stores the definition for the first field in a field definition service of the cloud service platform. In some of these embodiments, the field definition service of the cloud service platform provides the definition for the first field to a telemetry service of the cloud service platform.

In some embodiments of the method 1400, a field bridge engine of the cloud service platform stores the first field data for the first field in a field data service of the cloud service platform. In some of these embodiments, the field data service is to indicate to a telemetry service of the cloud service platform that the first field has been used.

In some embodiments of the method 1400, a field bridge engine of the cloud service platform is launched in response to a signal made by a bridge launcher of the local application.

The systems disclosed herein may include one or more processors and/or controllers using instructions present thereon to implement one or more functionalities of each such power adapter as those functionalities are described herein. The instructions used by such processors and/or controllers may be stored on a non-transitory computer-readable storage medium on (or in communication with) such controllers and/or processors. It is anticipated that these processors and/or controllers (and associated non-transitory computer-readable instructions for use thereon) may be present in any embodiment disclosed herein (even if not explicitly discussed).

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the prin-

The invention claimed is:

1. A cloud service platform that is integrated over a network with a local application operating on a remote device, comprising:
   one or more processors; and
   a memory storing instructions that, when executed by the processors, configure the processor to operate, for the cloud service platform:
      a field management engine to create a definition of a first field used by the cloud service platform, the definition including metadata used to map fields to forms stored in a forms database that is configured to communicate with the cloud service platform;
      an event streams engine to receive a message from the local application, the message comprising a form having the first field and a second field of the local application and data including metadata for the first and second fields of the form; and
      a field bridge engine to:
         receive first field data for the first field and second field data for the second field from a user of the local application;
         apply the first field data to the first field of the form and the second field data in the second field of the form when an indication of the metadata for the fields of the form matches with metadata for the first and second field data based on the definition; and
         provide the form to a print service for presentation.

2. The cloud service platform of claim 1, wherein the first field data for the first field is applied to the form according to a workflow for the form, the workflow being provided to the cloud service platform by the local application.

3. The cloud service platform of claim 1, wherein the field management engine is further to store the definition for the first field in a field definition service of the cloud service platform.

4. The cloud service platform of claim 3, wherein the field definition service is to provide the definition for the first field to a telemetry service of the cloud service platform.

5. The cloud service platform of claim 1, wherein the field bridge engine is further to store the first field data for the first field in a field data service of the cloud service platform.

6. The cloud service platform of claim 5, wherein the field data service is to indicate to a telemetry service of the cloud service platform that the first field has been used.

7. The cloud service platform of claim 1, wherein the field bridge engine is to be launched in response to a signal made by a bridge launcher of the local application.

8. A method of a cloud service platform that is integrated with a local application operating on a remote device, comprising:
   providing, in response to a signal provided by the local application to the cloud service platform, to a user of the local application, a prompt to enter field data of a first field defined at the cloud service platform, a definition of the first field including metadata used to map the first field to forms stored in a forms database that is configured to communicate with the cloud service platform;
   receiving, from the user, the field data;
   storing the field data at the cloud service platform;
   receiving a first form from the local application, the first form including metadata for a first field of the first form;
   applying the field data to the first form, when an indication of the metadata for the first field of the first form matches with metadata in the definition of the first field, and
   providing the form to a print service for presentation.

9. The method of claim 8, further comprising:
   receiving a second form from a forms database; and
   applying the field data to a second form.

10. The method of claim 9, further comprising providing the first form and the second form to a print service.

11. The method of claim 8, further comprising:
   receiving a second form from the local application, and applying the field data to the second form.

12. The method of claim 11, further comprising providing the first form and the second form to a print service.

13. The method of claim 8, wherein the prompt to enter the field data is organized according to a domain of the first field.

14. The method of claim 8, further comprising recording that the field data was applied to the first form in telemetry data for the cloud service platform.

* * * * *